(12) United States Patent
Falkenstein et al.

(10) Patent No.: US 7,016,379 B2
(45) Date of Patent: Mar. 21, 2006

(54) INTEGRATED NETWORK ELEMENT

(75) Inventors: Don I. Falkenstein, Lexington, MA (US); Larry P. Lewis, Haverhill, MA (US); Warren C. Trested, Jr., East Hampstead, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 936 days.

(21) Appl. No.: 09/910,601

(22) Filed: Jul. 20, 2001

(65) Prior Publication Data

US 2002/0080445 A1    Jun. 27, 2002

Related U.S. Application Data

(60) Provisional application No. 60/220,240, filed on Jul. 21, 2000.

(51) Int. Cl.
*H04J 3/04* (2006.01)

(52) U.S. Cl. .................. 370/535; 370/401; 370/218

(58) Field of Classification Search ............ 370/535, 370/536, 537, 542, 216, 217, 218, 225, 227, 370/228, 241, 242, 235, 401, 419, 463, 254
See application file for complete search history.

(56) References Cited

U.S. PATENT DOCUMENTS 5,583,855 A * 12/1996 Ball ..................... 370/376
6,404,734 B1 * 6/2002 Stamatelakis et al. ...... 370/227
6,697,329 B1 * 2/2004 McAllister et al. ........ 370/235
6,707,789 B1 * 3/2004 Arslan et al. ............. 370/218
6,839,514 B1 * 1/2005 Sharma et al. ............ 398/2

* cited by examiner

*Primary Examiner*—Brian Nguyen

(57) ABSTRACT

An integrated network element includes the functions of multiple Ring add-drop-multiplexers and a digital cross connect. A user may provision cross connections between input and output path-level units of bandwidth referred to herein as "logical tributaries." Each port within the integrated network element may be combined with one or more other ports to form a user-provisioned association of optical interface ports that is used for line protection (or SDH multiplex section protection) in a particular type of network configuration, referred to as a "port protection group". Each port within a port protection group may have a plurality of logical tributaries associated with it. By allowing a user to provision cross connections between logical tributaries, rather than directly between ports, an integrated network element in accordance with the principles of the present invention permits a user to provision working and protection paths from any port to any other port in the integrated network element without requiring the user to know the details, such as switching status, whether a port associated with a particular port tributary is a member of a port protection group, what type of port protection group a port tributary is a member of, the state of protection switching, or other such details. A user interface allows a user to provision the behavior and report the results of path-level signal monitoring (for faults and performance) and of path-level protection switching.

39 Claims, 19 Drawing Sheets

NETWORK ELEMENT/EQUIPMENT VIEW

NETWORK CONFIGURATION/SERVICES VIEW

INTEGRATED NETWORK ELEMENT

CROSS-REFERENCE TO RELATED APPLICATIONS

This application claims the benefit of U.S. provisional application Ser. No. 60/220,240, entitled, "Integrated Network Element" filed on Jul. 21, 2000, having the same inventors and assigned to the same assignee as this application and which is hereby incorporated by reference.

FIELD OF INVENTION

The invention is related to optical communications systems and, more particularly, a network element that integrates a plurality of add/drop multiplexers with a digital crossconnect

BACKGROUND

Conventional ring add/drop multiplexers (ADMs) support only a single type of ring and only one ring per network element: A user deploys and interconnects a number of different network elements at each location, using the quantity of each type of system needed for the application.

The use of a separate network element for the interface to each ring terminated at a location requires additional interfaces to interconnect the separate network elements and the additional common equipment and operations interfaces for each separate network element. The cost, space and power for these additional interfaces and common equipment can be saved by consolidating the Ring ADM functions into a single network element which also supports the DCS function.

However, this savings could be outweighed by the disadvantages of under-utilized equipment, limitations in networking capabilities, operational inconsistencies, or tradeoffs between the flexibility and simplicity of cross-connection and path-protection operations, which, if not addressed, would stem from the consolidation itself. For example, stranding of unused ports and cross-connect capacity would result from inflexibility in provisioning different types of network configurations (e.g., 4-Fiber BLSR/MS-SPRing, 2-Fiber BLSR/MS-SPRing, SONET 1+1 line protection, SDH 1+1 multiplex section protection, or 1×N/1:N line protection) independently for each of the ports in the system (including the ports on different port units within a shelf and also the multiple ports on the same optical port unit). Inefficient port utilization resulting from this inflexibility would lead to reduced system capacity and/or the need for additional equipment.

Advanced networking capabilities become possible with the consolidation of various network configurations in a single network element, but they can be realized only if the system can support sufficient flexibility in provisioning the network configuration for each port and the cross-connections for each tributary.

SUMMARY

An apparatus and method in accordance with the principles of the present invention consolidates the functions of multiple Ring add-drop-multiplexers (ADMs) and a digital cross connect (DCS) into a single, integrated network element to provide efficient and flexible port utilization, advanced networking capabilities, and consistency of operations for different network configurations.

An integrated network element in accordance with the principles of the present invention allows users to provision cross connections between input and output path-level units of bandwidth referred to herein as "logical tributaries." Each port within the integrated network element may be combined with one or more other ports to form a "port protection group", that is, a user-provisioned association of optical interface ports that is used for line protection (or SDH multiplex section protection) in a particular type of network configuration. And each port within a port protection group may have a plurality of logical tributaries associated with it. By allowing a user to provision cross connections between logical tributaries, rather than directly between ports, an integrated network element in accordance with the principles of the present invention permits a user to provision working and protection paths from any port to any other port in the NE without requiring the user to know the details, such as switching status, whether a port associated with a particular port tributary is a member of a port protection group, what type of port protection group a port tributary is a member of, the state of protection switching, or other such details.

Additionally, a user interface allows a user to provision the behavior and report the results of path-level signal monitoring (for faults and performance) and of path-level protection switching, again, without requiring the user to be aware of the details such as switching status, etc. An NE controller monitors the detailed, physical, information and maps the port tributaries into logical tributaries, automatically adjusting interconnections to accommodate protections switches, etc., according to user-specified provisioning.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
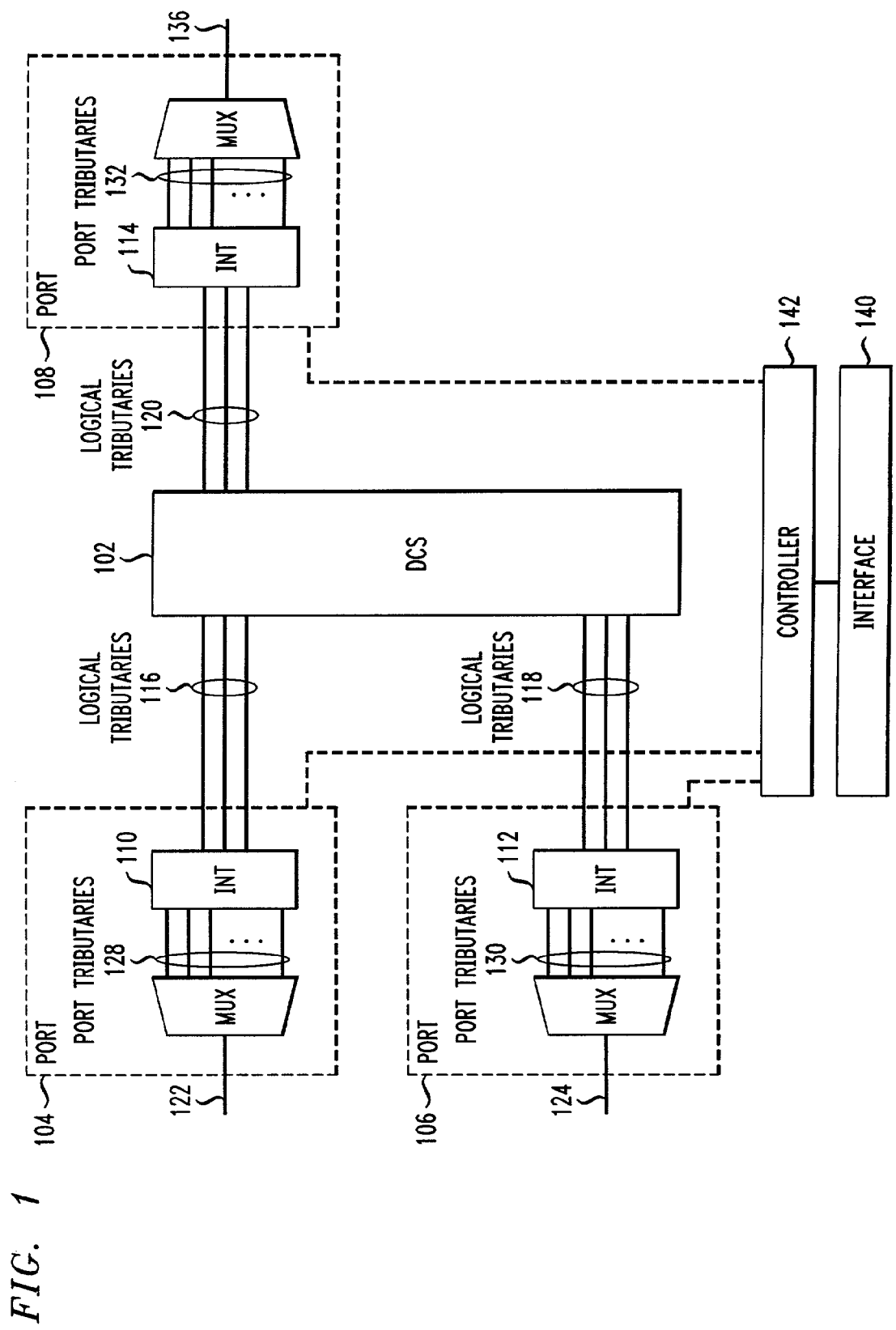
FIG. 1 is a conceptual block diagram of an integrated network element in accordance with the principles of the present invention.

As illustrated in the conceptual block diagram of FIG. 1, an integrated network element 100 in accordance with the principles of the present invention includes the functionality of a digital cross connect (DCS) 102 and a plurality of add/drop mulitplexers (ADMs) 104, 106, 108. Interfaces (INT) 110, 112, and 114, which employ "logical tributaries" 116, 118, and 120 between the DCS 102 and the ports 122, 124, and 126, permit traffic from any port (that is, transmission interface between network elements) to be routed to any other port, through the DCS 102. In accordance with the principles of the present invention the interfaces 110, 112, and 114 effect a mapping from physical port tributaries 128 130, and 132 to logical tributaries 116, 118, and 120.

An integrated network element in accordance with the principles of the present invention allows users to provision cross connections between input and output path-level units of bandwidth referred to herein as "logical tributaries." Each port within the integrated network element may be combined with one or more other ports to form a "port protection group", that is, a user-provisioned association of optical interface ports that is used for line protection (or SDH multiplex section protection) in a particular type of network configuration. And each port within a port protection group may have a plurality of logical tributaries associated with it. By allowing a user to provision cross connections between logical tributaries, rather than directly between ports, an integrated network element in accordance with the principles of the present invention permits a user to provision working and protection paths from any port to any other port in the NE without requiring the user to know the details, such as switching status, whether a port associated with a particular port tributary is a member of a port protection group, what type of port protection group a port tributary is a member of, the state of protection switching, or other such details.

The group of ports represents both a protection switching entity and also a set of lines that carry services from/to another network element(s). Port protection groups also determine, for optical interface ports, the set of "logical tributaries" from and to which the user can provision cross-connections. The operations on a port protection group include the provisioning, control, and status of line protection switching. Additionally, a user interface 140 allows a user to provision the behavior and report the results of path-level signal monitoring (for faults and performance) and of path-level protection switching, again, without requiring the user to be aware of the details such as switching status, etc. An NE controller 142 monitors the detailed, physical, information and maps the port tributaries into logical tributaries, automatically adjusting interconnections to accommodate protections switches, etc., according to user-specified provisioning.

The term "Port" will be used herein to describe a physical transmission interface, consisting of both an input and an output, which may be used to carry traffic between network elements. The words "port" and "line" may often be used synonymously. "Port" emphasizes the physical interface, and "line" emphasizes the interconnection. Either may be used to identify the signal being carried. Optical ports can be provisioned for either SONET OC-N or SDH STM-N operation (when SDH is supported for that type of port). Operational differences determined by a port's provisioning include: pointer processing fault and performance monitoring (parameters and reporting), maintenance signaling (unequipped, AIS, RDI), cross-connections (supported rates), and protection switching. The operations on a port (line) include SONET line-level (or SDH multiplex section level), and DS3 fault and performance monitoring. Some operations apply to only the input or output of a port; others may apply to both the input and output.

The term logical tributary will be used herein to refer to a path-level unit of bandwidth within a port protection group (or a port not in a port protection group), or the signal(s) being carried in this unit of bandwidth; for example, an STS-1, STS-3, or STS-12 tributary within an OC-N line in a port protection group, or an STS-1 tributary associated within a DS3/EC-1 port, or a VC-3 or VC-4 tributary within an STM-N line in a port protection group. A logical tributary in a port which is not combined with other ports in a port protection group (such as, an electrical port or unprotected optical port) is the same entity as a port tributary. A logical tributary in a port protection group is a different entity, on the protected (switched) side of the group, opposite a port tributary. The identifier for a logical tributary refers to the port tributary used for transmission normally, in the absence of a line protection switching event. The actual connectivity during line protection switching depends on the provisioning and current state of the port protection group. A logical tributary is associated with a particular service (unit of traffic) carried from/to another network element(s). The operations on a logical tributary include cross-connections and path-level fault and performance monitoring. Some operations apply to logical input and/or output tributaries, and others to logical input tributaries only. The operations which apply to a port tributary can apply to a logical tributary, but only when (and because) it is the same entity.

An integrated NE in accordance with the principles of the present invention supports path protection for both ring interworking and for unidirectional path switched ring (UPSR)/SNCP applications as a part of a cross-connection topology, rather than as a type of port protection group. This approach allows the user to provision path protection for circuits in a generic way that can be supported independent of any port rate and independent of any port protection (i.e., network configuration). The integrated NE supports not only the typical UPSR application with unprotected ports, but also an array of advanced networking topologies such as Path-in-Line (path protection for tributaries in a 2-Fiber or 4-Fiber BLSR/MS-SPRing) within a single network element. Such advanced networking topologies formerly required separate network elements at each location: one NE to support the path-switched ring (e.g. DDM-2000) and another to support the bidirectional line switched ring (BLSR)/MS-SPRing (e.g., FT-2000). A single NE in accordance with the principles of the present invention system consolidates these functions into a single network element, and it provides the user with sufficient flexibility to configure similar combinations that could be obtained with separate NEs. In addition, the approach of using a generic cross-connection topology allows the system to more easily support the many variations of ring interworking, both for the UPSR and BLSR/MS-SPRing, including (for BLSR/MS-SPRing) both the drop-and-continue and dual transmit methods, using either working or protection bandwidth.

The functional architecture of the integrated NE includes the port protection group, the logical tributary, and the cross-connection leg. Cross-connections are provisioned by the user between input/output logical tributaries. The port tributary in a port protection group normally used for transmission, that is, the port tributary used for transmission in the absence of a line protection switching event, is the logical tributary. The actual connectivity of logical tributaries from/to port tributaries during line protection switching depends on the provisioning and current state of the port protection groups on the input and output of each cross-connection leg.

Figure 2:
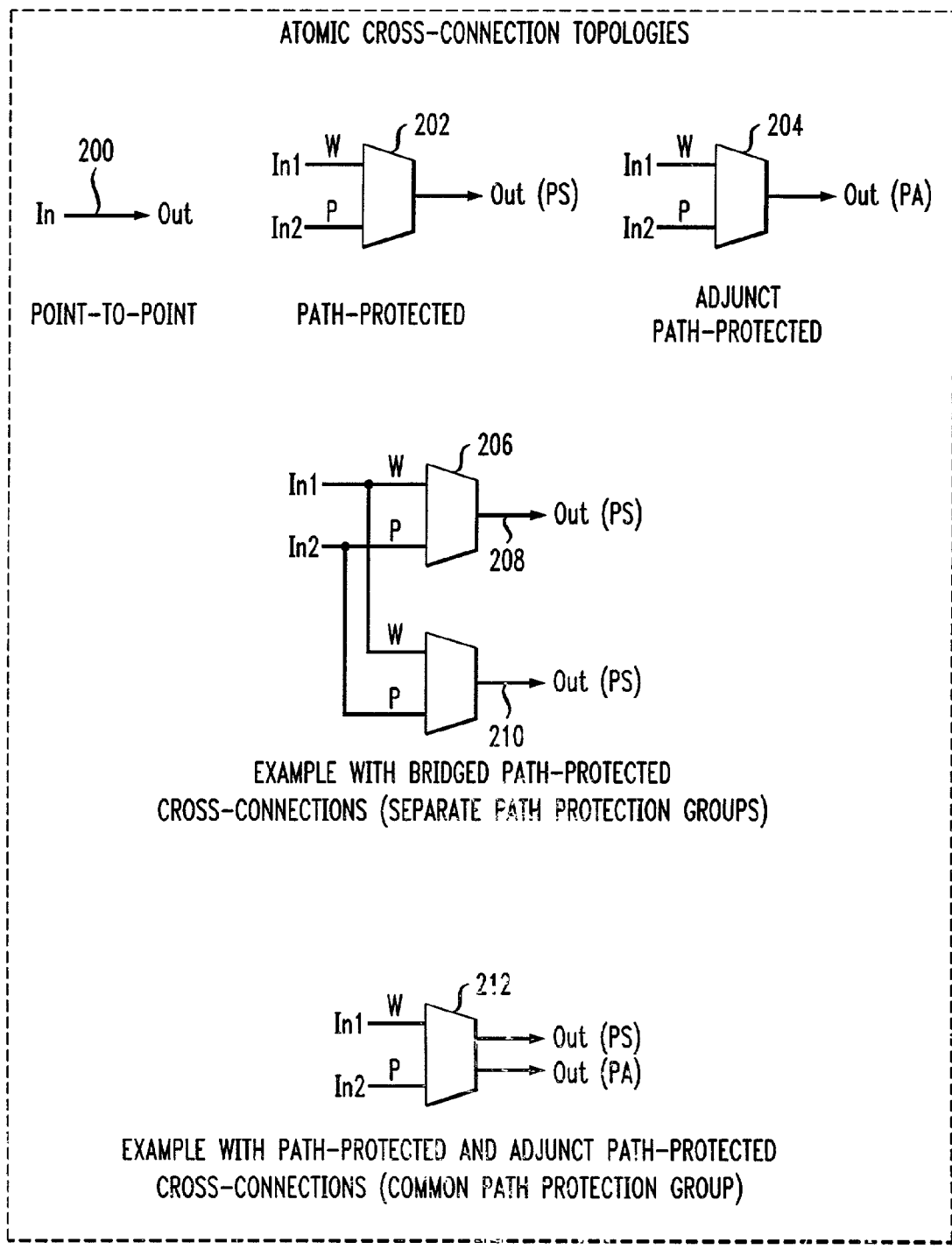
FIG. 2 is a conceptual block diagram of various atomic cross-connection topologies in accordance with the principles of the present invention.

Turning now to FIG. 2, three one-way cross connections which can be established and removed by one command to the NE, but which cannot have a smaller part of it established or removed, referred to herein as "atomic topologies" are illustrated in the conceptual block diagram of FIG. 2. A given cross-connection can be identified by its topology, its logical input and output tributaries, and its cross-connection rate. The integrated NE supports several commands which a user may employ to establish, remove, or modify cross connections. The commands include: establish, remove, modify (parameters of a cross-connection leg), roll (the input tributary of a leg), and convert (from one topology to another). The support of the bridging capability allows independent atomic cross-connections to be established with the same input tributary(ies).

The Point-to-Point atomic cross-connection topology 200 consists of only one leg. (In-Out). (A leg is a one-way connection provisioned from one logical input tributary to one logical output tributary.) Note that a two-way point-to-point cross-connection consists of two point-to-point atomic cross-connections at the same cross-connection rate and in opposite directions between two tributaries. Although a two-way point-to-point connection can be established or removed with a single command, it is not atomic because each direction can be established or removed (or converted to another topology) independently. The point-to-point atomic cross-connection topology has a reported lea or a leg pair 1way, 2way.

The Pat-Protected atomic cross-connection topology 202 consists of one path protection group with two legs, a working leg (In1-Out) and a protection leg (In2-Out). A cross-connection with this topology has two logical input tributaries, and one logical output tributary. The path protection group is established or removed as part of this cross-connection topology, and it provides path-level protection switching for all the constituent signals carried by the cross-connection. (With fixed-rate tributary operation, there is only a single constituent signal carried by any cross-connection, whose rate matches the signal rate. However, with adaptive-rate tributary operation, a cross-connection can carry more than one constituent signal.) This topology is used in all applications involving path protection. The path-protected atomic cross-connection topology 200 has a reported leg or leg pair 1wayPS,W; 1wayPS,P.

The Adjunct Path-Protected atomic cross-connection topology 204 consists of two legs (adjunct legs) with the same rate and the same logical input tributaries as an existing path-protected cross-connection but a different logical output tributary. It differs from the path-protected atomic topology in that it does not include a path-protection group, and it depends on the existence of a path-protected cross-connection. This topology is used for applications where multiple outputs are needed from a single path protection group. For example, connection between two UPSR rings (SONET) or SNCP rings (SDH). This connection requires path selection to drop the circuit from the first ring and bridging to add the circuit into the second ring. Or, dropping traffic at many tributary interfaces in UPSR/SNCP ring, e.g. video distribution, the path-selected signal is dropped to multiple ports. A bridged path protected cross-connection involving separate path protection groups 206 selects and routes working leg ml and protection leg In2 input traffic to ports 208 and 210. Path protected and adjunct path protected cross connections 212 employ a common path protection group to select and route working and protection legs to ports 208 and 210. The adjunct path-protected cross-connection topology 204 has a reported leg or leg pair 1wayPA, W; 1wayPA,P.

A user establishes or removes a path protection group as part of the path-protected atomic cross-connection topology. The path protection group provides path-level protection switching for all the constituent signals carried by the cross-connection. The commands addressed to a path protection group itself do not include establish or remove, but they do include: modify (switching parameters), retrieve (switching status), and operate (manual/forced switches). With fixed-rate tributary operation on an input port (where the user provisions a port's tributaries for expected signal rates), there is only a single constituent signal carried by any cross-connection, whose rate matches the tributary rate. However, with adaptive-rate tributary operation (where the user does not provision the expected signal rates), a cross-connection can carry more than one constituent signal. To accommodate the case of more than one constituent signal within a path-protected cross-connection and its path protection group, the integrated NE employs both a path protection group and a constituent path selector.

A constituent path selector is a path-level protection switching function that selects a constituent signal from either of two logical input tributaries (working path or protection path, identified by the provisioning of the cross-connection's working and protection legs). It operates at the constituent signal rate. There may be one or more constituent path selectors operating independently within each path protection group, one for each constituent signal in the logical output tributary. The path protection group adapts to the current constituent signal rates. The provisioning of fixed or adaptive-rate tributary operation on the two input ports need not match, but the constituent signal rates on the two logical input tributaries must match for normal operation of a constituent path selector. The constituent path selector(s) in a path protection group can themselves be addressed with retrieve and operate commands. However, the switching parameters are inherited from those provisioned for the path protection group (or other entities). The path protection switching parameters that can be provisioned include:

Revertive/Non-Revertive (per path protection group)
Hold-off time enable/disable (per path protection group)
PDI-P enable/disable (per logical input tributary, applicable to SONET ports only)
Path-level Signal Degrade threshold (per logical input tributary)
Path-level Signal Degrade Excessive threshold (per logical input tributary)

Path-level Wait-to-Restore time interval (per system)
Path-level Hold-off time interval (per system)

In various path-protection applications the first two of these provisionable parameters are to be set differently. SONET-standard switching criteria are supported when the ports of the two logical input tributaries are both provisioned for SONET operation. SDH-standard switching criteria are supported when they are both provisioned for SDH operation. For SDH, the path protection group can also be provisioned to use either the SNC/I or SNC/N switching criteria. This applies for all applications of path protection, including ring interworking.

The method for DNRI (dual node ring interworking, or ring interworking) on Protection (RIP) in a BLSR/MS-SPRing (with either the Drop-and-Continue method or the Dual Transmit method) is to make use of the existing atomic cross-connection topologies, but to add a parameter for each end of a cross-connection leg: RIP Secondary Node. Additional values of the cross-connection application parameter (to distinguish the use of working or protection bandwidth for ring interworking in each of the rings) would not be needed.

Port Protection Groups which are user-provisionable enable the efficient usage of the multiple ports per optical port unit and efficient mixing of protection/network configurations within the same shelf. This enables the consolidation of DCS and BLSR ADM functionality (UPSR ADM functionality is addressed separately) into each single network element, with the inherent flexibility to support any mix (including multiple rings and multiple types of rings) and with a minimum number of shelves and a maximum utility of total capacity.

As previously described, a port protection group is a user-provisioned association of optical interface ports which is used for SONET line protection (or SDH multiplex section protection) in a particular type of network configuration. The group of ports represents both a protection switching entity and also a set of lines that carry traffic from/to another network element(s). Four types of port protection groups are defined: 2-fiber and 4-fiber BLSR (bidirectional line-switched ring), 1+1 line protection, and 1×N line protection. Each type consists of a specific number of ports which are assigned roles for specific lines in a specific line protection switching configuration. Each type can be provisioned either with SONET OC-N ports or with SDH STM-N ports.

A user provisions a port protection group by selecting any supported type of line protection (e.g., 2-Fiber BLSR/MS-SPRing, 4-Fiber BLSR/MS-SPRing, 1+1 line protection, or 1×N line protection), and then by selecting specific ports among the optical port units (which may have multiple ports) in any slot in the same shelf. Depending on the specific type of protection which is selected, the integrated NE enables the user to select the required number of ports, to assign a port to each of the required roles (e.g., west or east, working or protection), and to provision or operate any applicable protection switching options. The integrated NE automatically determines the physical connectivity required from/to the path-level tributaries in these ports, based on the user-provisioned information and the current state of the line protection switching. All port protection groups are provisioned and operated independently of each other, and each port on the same optical port unit can be either provisioned and operated in a separate port protection group or left unprotected.

The integrated NE has the ability to support port protection groups that are user-provisionable. For example, a user may provision a selection of any of several different line protection switching configurations for an optical interface port, associate any of the ports in a shelf and assign west/east and working/protection roles to the selected ports for any selected protection switching configuration, and independently provision and operate ports within the same port unit and port protection groups within a shelf. The integrated NE automatically configures the physical connectivity of each path-level tributary for any of the many different line protection switching configurations that can be provisioned among the many ports in a shelf.

A BLSR port protection group is used either for a SONET BLSR or for an SDH MS-SPRing, depending on whether its ports are provisioned for SONET OC-N or SDH STM-N operation. A BLSR port protection group with its ports provisioned for SDH STM-N operation can be used, by provisioning an additional parameter, for either the normal application or the transoceanic application of an MS-SPRing (ITU-T G.841 Annex A). A 1+1 port protection group is used either for SONET 1+1 line protection or for SDH 1+1 multiplex section protection (MSP). The 1+1 port protection group can be used, with ports provisioned for SONET, for either the unidirectional or bidirectional 1+1 protocol, and with ports provisioned for SDH, for either the unidirectional (ITU-T G.841), the standard bidirectional (ITU-T G.841) or the optimized bidirectional 1+1 MSP protocol (ITU-T G.841 Annex B). A 1×N port protection group is used either for SONET 1×N line protection or for SDH 1:N MSP. Unprotected operation is supported for optical interface ports that are not in a port protection group. There is no user-provisionable port protection group required for electrical interface port units or for unprotected optical interface ports, only for protected optical interface ports.

"BLSR" is used here to mean either a SONET 2-Fiber/4-Fiber BLSR, Bidirectional Line-Switched Ring, or an SDH 2-Fibre/4-Fibre MS-SPRing, Multiplex Section Shared Protection Ring, depending on whether the ports are provisioned for SONET OC-N or SDH STM-N operation.

When an optical interface port is provisioned as a member of a port protection group for a specific type of line protection, the port (line) is assigned a ring-side (west or east) and/or line name (working or protection) to identify its role. A 2-fiber BLSR has 2 lines identified by west and east ring-sides. A 4-fiber BLSR has either 2 or 4 lines identified by west and/or east ring-sides (either or both) and as working and protection lines. With 1+1 line protection there are 2 lines identified as working and protection lines. (In the context of the 1+1 MSP optimized protocol, the 2 lines are identified as "working line 1" and "working line 2".) With 1×N line protection there are N+1 lines identified as working lines 1 through N and a protection line.

Working tributaries are tributaries that can be protected. Protection tributaries are unprotected tributaries that can be used to protect other tributaries. In BLSR and 1×N port protection groups, protection access is supported. Protection access is the provisioning of traffic to be carried by protection tributaries when they are not being used to carry the protected service traffic. This includes preemptible protection access (also called "extra traffic") which is preempted during protection switching, and non-preemptible protection access (also called "NUT" or Non-preemptible Unprotected Traffic) in which the protection tributaries are provisioned not to participate in the protection switching. Protection access is not applicable to 1+1 line protection because the service traffic is permanently bridged at the head end to both lines.

Figure 3A:
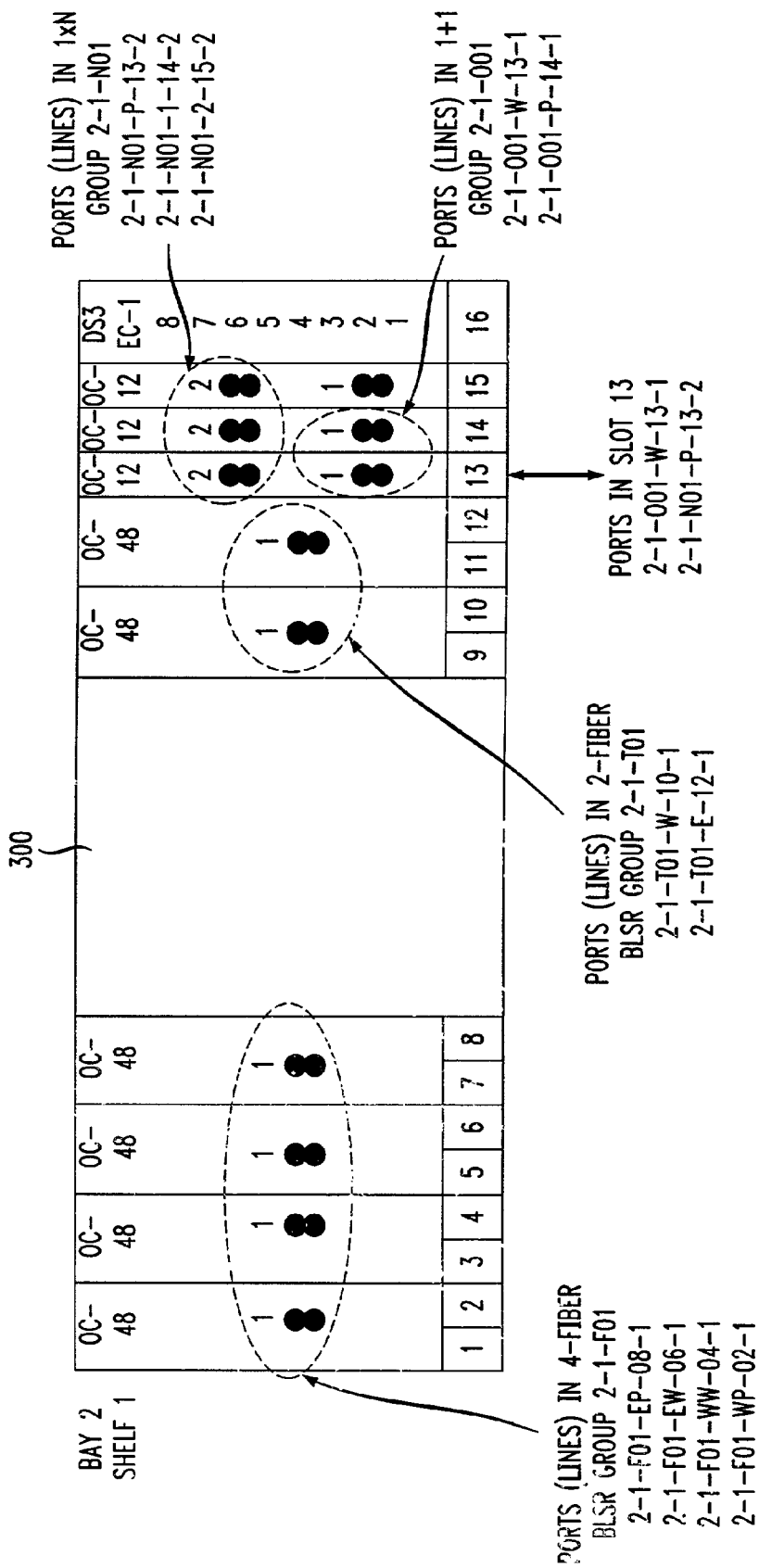
FIGS. 3A and 3B are conceptual block diagrams which depict network equipment and network services views of an integrated network element in accordance with the principles of the present invention.
Figure 3B:
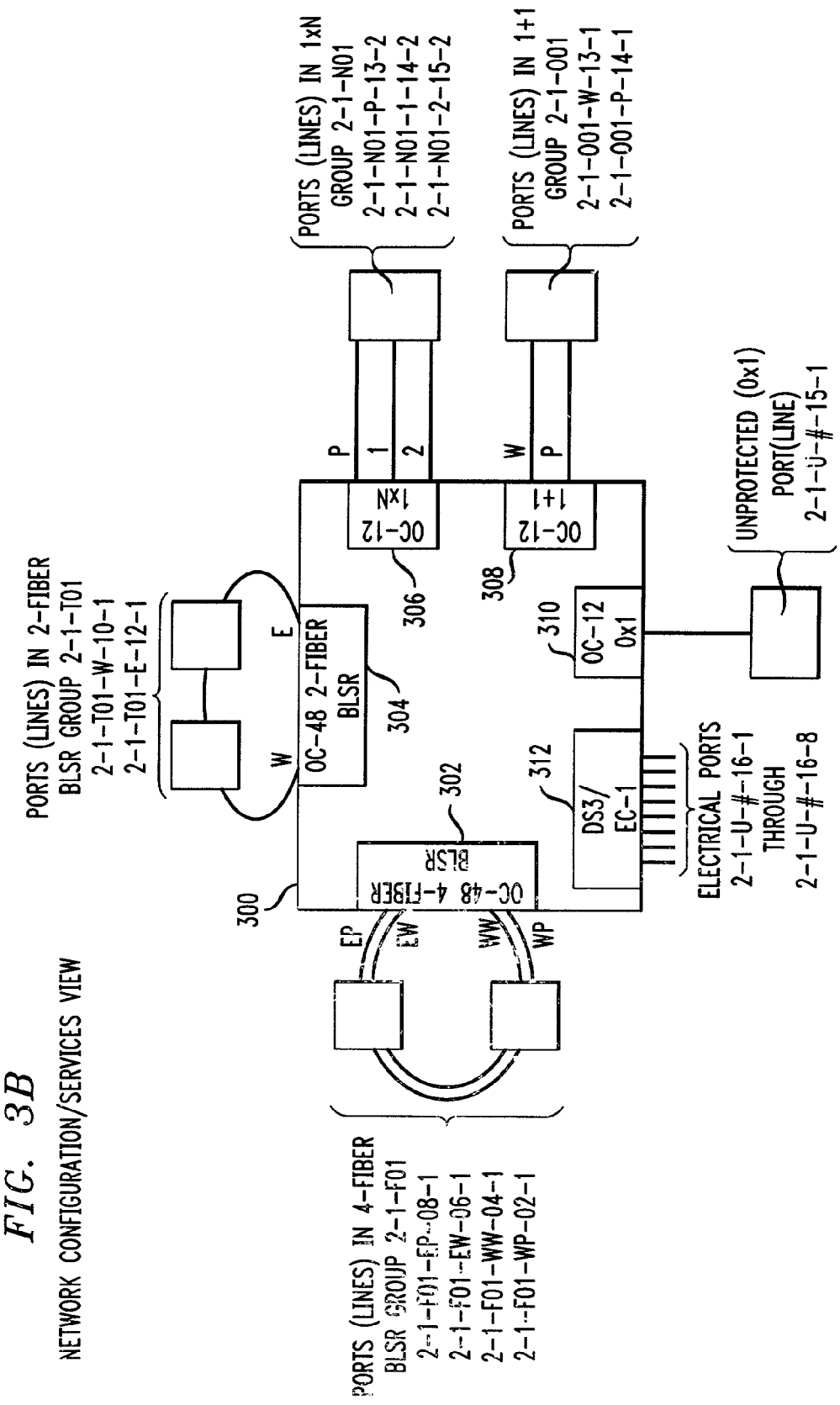

Turning now to FIGS. 3A and 3B, which depicts an integrated NE in accordance with the principles of the present invention respectively from the physical, network element equipment perspective and from the network configuration services perspective. The mechanical view of FIG. 3A illustrates an example of an interface shelf with a mix of OC-48, OC-12, and DS3/EC-1 port units in 16 port unit slots, and a mix of the four types of port protection groups that has been provisioned for the ports on these port units. Each dotted-line circle indicates a set of ports in a port protection group. These are the same port protection groups as in the FIG. 3B. This illustrates a port protection group from the point of view that it represents a user-provisioned association of optical interface ports that is used for SONET line protection (or SDH multiplex section protection). The illustrated example also shows that the two OC-12 ports on each port unit can be connected to different equipment and with different types of protection (1+1 or 1×N). Individual ports can also be left unprotected (slot 15 port 1). The network element perspective of FIG. 3B illustrates the connections between this network element and others, using the applicable set of ports/lines (west and east ring-sides, and/or working and protection lines) for each type of port protection group. This illustrates a port protection group from the point of view that it represents a set of lines that carry traffic from/to another network element (or more than one other network element in a ring).

The integrated network element 300 is connected to other network elements with each of the four types of port protection groups. A four-fiber BLSR port protection group 302 employs four ports, designated: 2-1-F01-EP-08-1, 2-1-F01-EW-06-1, 2-1-F01-WW-04-1, and 2-1-F01-WP-02-1, which correspond to the first eight slots of shelf 1 of FIG. 3A. A two-fiber BLSR port protection group 304 includes two ports, designated 2-1-T01-W-10-1 and 2-1-T01-E-12-1, which correspond to slots 9 through 12 of shelf 1 in FIG. 3A. A 1×N port protection group 306 includes ports designated 2-1-N01-P-13-2, 2-1-N01-1-14-2, and 2-1-N01-2-15-2, which correspond to port 2 of slots 13 through 15 in FIG. 3A. A 1+1 port protection group 308 includes ports 2-1-O01-W-13-1 and 2-1-O01-P-14-1 which correspond to port 1 of slots 13 and 14 of FIG. 3A. An unprotected optical port 310 is designated 2-1-U-#-15-1 which corresponds to port 1 of slot 15. A bank of electrical ports 312 2-1-U-#-16-1 through 2-1-U-#-16-8 occupy slot 16 of shelf 1 in FIG. 3A.

Figure 4:
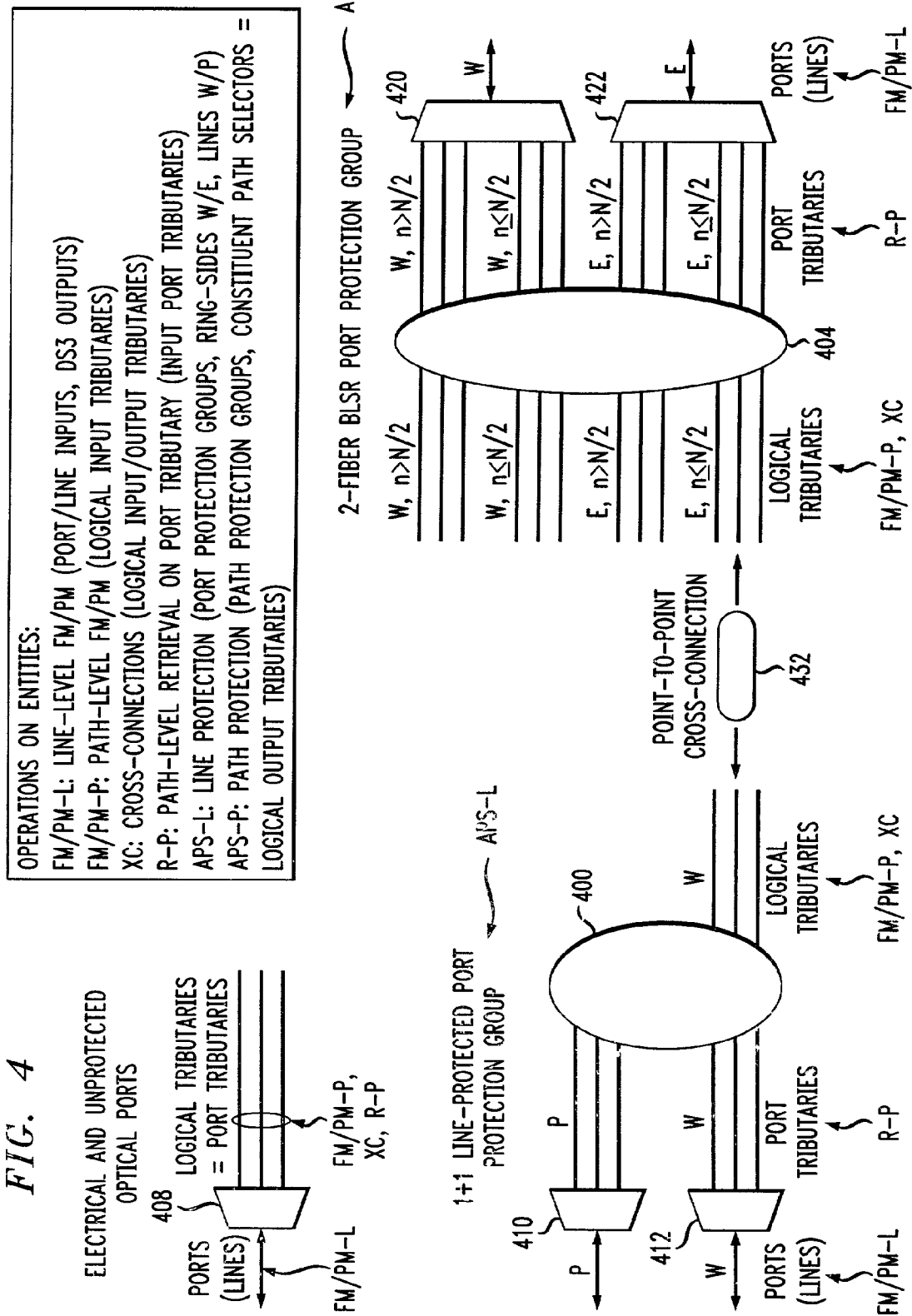
FIG. 4 is a conceptual block diagram which depicts various port protection groups in accordance with the principles of the present invention.
Figure 4:
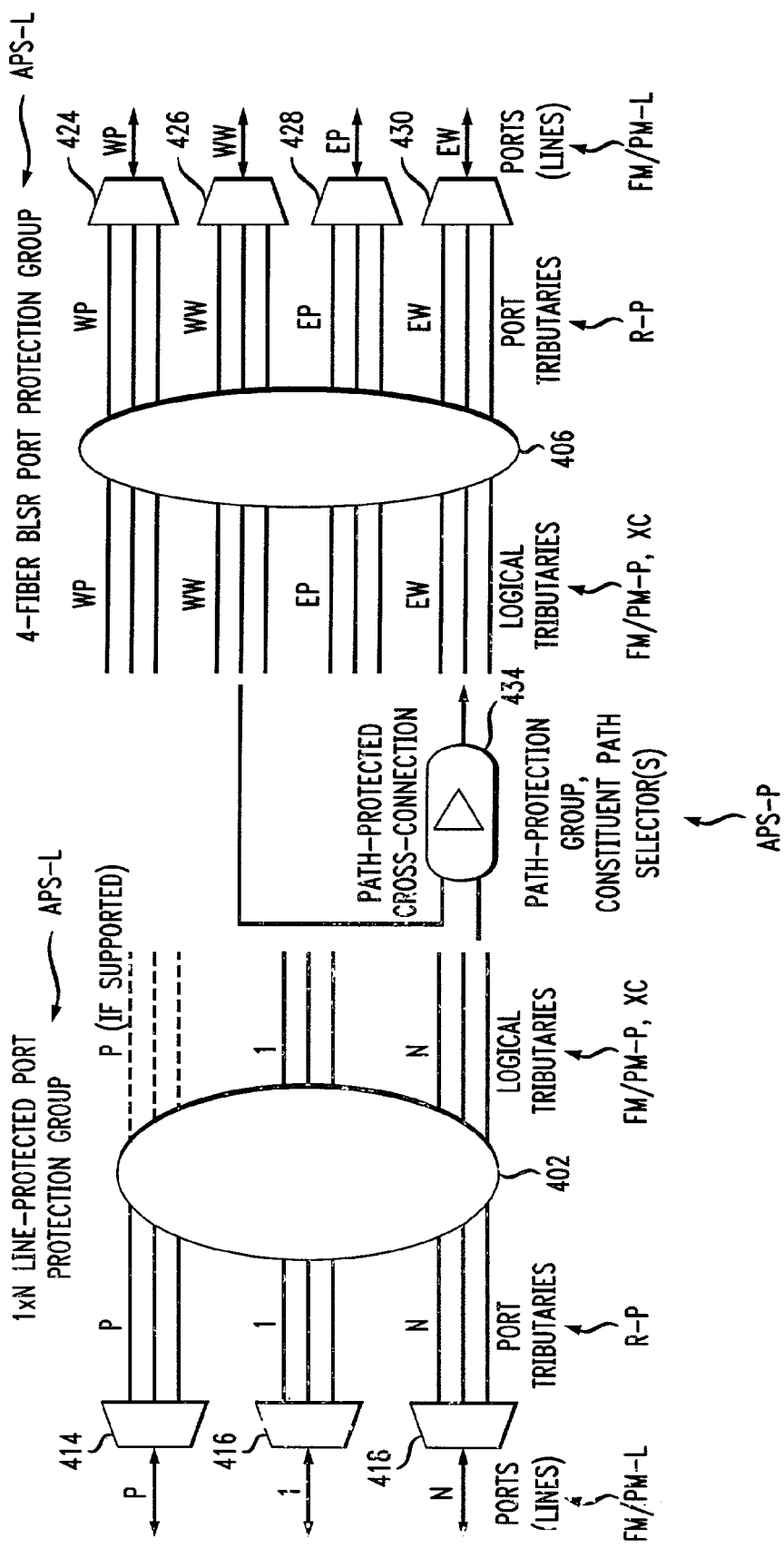

FIG. 4 illustrates port protection groups in terms of a functional view of the transmission part of a network element. The transmission interface ports of a network element, including electrical ports, unprotected optical ports, and the various types of port protection groups, are shown on the two sides of the figure. Elliptical symbols 400 402, 404, and 406 represent the line protection switching function in each port protection group. Equipment protection is not shown. Trapezoidal symbols 408, 410, 412, 414, 416, 418, 420, 422, 424, 426, 428, and 430 represent either the SONET Line Terminating Element between each OC-N or EC-1 port and its STS tributaries, or the SDH Multiplex Section between each STM-N port and its VC-N tributaries, or the gateway between a DS3 port and an STS-1 or VC-3 tributary, or the gateway between an E4 port and a VC-4 tributary. A two-way point-to-point cross-connection 432 connects logical input and logical output tributaries between a 1+1 line-protected port protection group and a 2-fiber BLSR port protection group. A one-way path-protected cross-connection 434 connects logical input and logical output tributaries between a 1×N line protected port protection group and a 4 fiber BLSR port protection group.

For an electrical or unprotected optical port, a port tributary and a logical tributary are the same entity. In the 2-Fiber and 4-Fiber BLSR port protection groups, each port tributary has a corresponding logical tributary from and to which cross-connections can be made because protection access is supported. The 1+1 port protection group has logical tributaries corresponding to the port tributaries on the working line only because there is no protection access. The 1×N port protection group has logical tributaries corresponding to the port tributaries on the working line, and it would have additional logical tributaries (shown with dotted lines) if protection access were supported.

The operations on a port protection group include the provisioning, control, and status of line protection switching. Some of the line protection switching operations apply to a specific ring-side or line in the port protection group. The operations on logical tributaries in a port protection group (cross-connections and path-level fault and performance monitoring) also identify the tributaries as being part of a specific ring-side and/or line.

The ENT-PROTN-GRP command allows the user to establish a user-provisioned association of optical interface ports that is used in line protection switching. If a circuit pack contains more than one optical port, the user can provision the type of protection for each port independently of the other ports. Unprotected operation is supported for optical interface ports that are not in a protection group. There are other types of protection groups which are established automatically by the system (that is, the integrated NE) and not user-provisioned by the ENT-PROTN-GRP command, such as the protection for electrical interface port units, timing, switch fabric, and controller equipment.

The following types of protection groups can be established by ENT-PROTN-GRP:

a) 2-Fiber BLSR Port Protection Group

A 2-Fiber BLSR port protection group can be provisioned consisting of two optical interface ports.

A 2-Fiber BLSR port protection group with ports provisioned for SONET OC-N operation is operated as a node in a 2-Fiber BLSR.

A 2-Fiber BLSR port protection group with ports provisioned for SDH STM-N operation is operated as a node in a 2-Fibre MS-SPRing.

The user can provision either of the ports as the West line and the other port as the East line.

The OC-N (or STM-n, n=N/3) rate of the ports determines the number of STS-1 eqv. tributaries, N, in each line of the port protection group.

One-half of the STS-1 eqv. tributaries in each line are used as working tributaries, and one-half of the STS-1 eqv. tributaries in each line are used as protection tributaries, according to standards.

The user can provision cross-connections from and to the working tributaries (for protected traffic) and also to the protection tributaries (for unprotected traffic).

Line protection switching states for a 2-Fiber BLSR port protection group include, according to standards: idle, ring switch (either side), pass-through.

Physical connections are made automatically to/from the working and protection tributaries in the physical ports (port tributaries), based on the user-provisioned cross-connection information (for logical tributaries) and the current state of the line protection switching:

Idle: working logical tributaries are connected to/from working port tributaries only, protection logical tributaries (protection access traffic) are connected to/from protection port tributaries Ring switch: each working logical tributary on one ring-side, either west or east, is bridaed to and selected from a protection port tributary on the opposite ring-side Pass-through: each protection port tributary is connected directly between opposite ring-sides b) 4-Fiber BLSR Port Protection Group A 4-Fiber BLSR port protection group can be provisioned consisting of either four or two optical interface ports.

When provisioned with four ports, and when these ports are provisioned for SONET OC-N operation, a 4-Fiber BLSR port protection group is operated as a node in a Closed 4-Fiber BLSR or as any node between the two end-nodes in an Open 4-Fiber BLSR. When these ports are provisioned for SDH STM-N operation, the group is operated as a node in a Closed 4-Fibre MS-SPRing or as any node between the two end-nodes in an Open 4-Fibre MS-SPRing. (This is called a 2-sided node.)

When provisioned with two ports, and when these ports are provisioned for SONET OC-N operation, a 4-Fiber BLSR port protection group is operated as either of the two end-nodes in an Open 4-Fiber BLSR. When these ports are provisioned for SDH STM-N operation, the group is operated as either of the two end-nodes in an Open 4-Fibre MS-SPRing. (This is called a 1-sided node.)

Note: An Open 4-Fiber BLSR/MS-SPRing can be used in point-to-point or linear add/drop network topologies. Each of the two end-nodes in these topologies is normally equipped with lines on only one side, either the West side or the East side. The protection switching standards for 4-Fiber BLSRs/MS-SPRings include the use of span protection switching and ring loopback protection switching. While a Closed 4-Fiber BLSR/MS-SPRing can support both types of switching, an Open 4-Fiber BLSR/MS-SPRing can support only span protection switching.

A 4-Fiber BLSR port protection group with its ports provisioned for SDH STM-N operation can be used, by provisioning an additional parameter, for either the normal application or the transoceanic application of an MS-SPRing. In the transoceanic application, the span switching and ring switching are performed differently than in the normal application, but the transoceanic application also supports both open rings (with span switching only) and closed rings (with span and ring switching).

When four ports are selected, the user can provision one of the four ports as the West Working line, one port as the West Protection line, one port as the East Working line, and one port as the East Protection line. When two ports are selected, the user can provision the two ports in either of two ways: one port as the West Working line and one port as the West Protection line; or one port as the East Working line and one port as the East Protection line.

The OC-N (or STM-n, n=N/3) rate of the ports determines the number of STS-1 eqv. tributaries, N, in each line of the port protection group.

All STS-1 eqv. tributaries in a Working line are used as working tributaries, and all STS-1 eqv. tributaries in a Protection line are used as protection tributaries, according to standards.

The user can provision cross-connections from and to the working tributaries (for protected traffic) and also to the protection tributaries (for unprotected traffic).

Line protection switching states for a 4-Fiber BLSR port protection group include, according to standards: idle, span switch (either or both sides independently), ring switch (either side), pass-through. The specifics of these states in an MS-SPRing depend on the protocol selected: either the normal application or the transoceanic application.

Physical connections are made automatically to/from the working and protection tributaries in the physical ports (port tributaries), based on the user-provisioned cross-connection information (for logical tributaries) and the current state of the line protection switching:

Idle: working logical tributaries are connected to/from working port tributaries only, protection logical tributaries (protection access traffic) are connected to/from protection port tributaries Span switch: each working logical tributary on a ring-side is bridged to and selected from a protection port tributary on the same ring-side Ring switch: each working logical tributary on one ring-side, either west or east, is bridged to and selected from a protection port tributary on the opposite ring-side Pass-through: each protection port tributary is connected directly between opposite ring-sides c) 1+1 Line Protected Port Protection Group A 1+1 Line-Protected port protection group can be provisioned consisting of two optical interface ports.

A 1+1 Line-Protected port protection group with ports provisioned for SONET OC-N operation is used for SONET 1+1 line protection.

A 1+1 Line-Protected port protection group with ports provisioned for SDH STM-N operation is used for SDH 1+1 multiplex section protection (MSP).

The user can provision either of the ports as the Working line and the other port as the Protection line.

The OC-N (or STM-n, n=N/3) rate of the ports determines the number of STS-1 eqv. tributaries, N, in each line of the port protection group.

The user can provision cross-connections from and to the working tributaries (for protected traffic), but cannot provision cross-connections from or to the protection tributaries (for unprotected traffic).

Physical connections are made automatically to/from the working and protection tributaries in the physical ports (port tributaries), based on the user-provisioned cross-connection information (for logical tributaries) and the current state of the line protection switching (including the provisioning for revertive or non-revertive behavior):

each working logical tributary is always bridged to the protection output port tributary as well as the working output port tributary each working logical tributary is selected from either the working or the protection input port tributary d) 1×N Line Protected Port Protection Group A 1×N Line-Protected port protection group can be provisioned consisting of N+1 optical interface ports.

A 1×N Line-Protected port protection group with ports provisioned for SONET OC-N operation is used for SONET 1×N line protection.

A 1×N Line-Protected port protection group with ports provisioned for SDH STM-N operation is used for SDH 1:N multiplex section protection (MSP).

The user can provision one protection port and also any number of working ports, from 1 to the maximum value of N supported for 1×N line protection at a given OC-N (or STM-N) rate.

The OC-N (or STM-n, n=N/3) rate of the ports determines the number of STS-1 eqv. tributaries, N (not to be confused with the N in 1×N) in each line of the port protection group.

The user can provision cross-connections from and to the working tributaries (for protected traffic) and also to the protection tributaries (for unprotected traffic).

Physical connections are made automatically to/from the working and protection tributaries in the physical ports (port tributaries), based on the user-provisioned cross-connection information (for logical tributaries) and the current state of the line protection switching Idle: working logical tributaries are connected to/from working port tributaries only, protection logical tributaries protection access traffic) are connected to/from protection port tributaries Switch: each working logical tributary on one of the working lines is bridged to and selected from a protection port tributary When establishing a port protection group, several conditions apply. In accordance with one embodiment of the invention, the following conditions are not allowed:

Ports not provisioned before port protection group established.

Ports protecting one another not in the same shelf.

Ports protecting one another not on different circuit packs.

One or more of the ports is already in a protection group.

There is an existing cross-connection, cross-connect loopback, reservation, or test access connection on the port.

Ports protecting one another not all provisioned for SONET OC-N operation or not all for SDH STM-N operation.

An OC-N/STM-N port rate which is unsupported for this type of protection group.

The ports do not have the same rate.

A subset of eastwkg, eastprotn, westwkg, westprotn is specified and that subset is not paired as eastwkg, eastprotn or westwkg, westprotn (applies to 4F).

For 1×N optical protection, the maximum value of N is exceeded.

In addition to the entities that comprise the port protection group, each type of protection group has a particular set of attribute parameters that affect the characteristics of the protection group, such as the protocol (e.g., unidirectional or bidirectional for 1+1, normal or transoceanic for MS-SPRing or whether or not the protection switching is revertive.

The ED-PROTN-GRP command allows the user to edit the attributes associated with a protection group. Also with this command the user can change a 4-Fiber BLSR port protection group with 2 ports (a 1-sided node) to one with 4 ports (a 2-sided node), or vice versa, by adding or removing two ports on either side. Similarly, the user can change the number of lines in a 1×N port protection group by adding or removing a working line. Additionally, for a 4-Fiber BLSR port protection group with either 2 or 4 ports, the user can interchange which port(s) is (are) provisioned as a West line and which as an East line.

A command, RTRV-PROTN-LST, allows the user to retrieve a list of all protection groups that exist for a specified shelf. A user may retrieve the provisioned information for a port protection group(s) as well as the current status information such as the line protection switching state using the RTRV-PROTN-GRP command. The DLT-PROTN-GRP command allows the user to delete any protection group that was created via ENT-PROTN-GRP.

Switching in a port protection group from a working port to a protection port, or vice versa, is controlled by physical events such as a failure. In addition, the OPR-PROTNSW and RLS-PROTNSW commands can be used to cause a protection switch. When there is a protection switch state change, autonomous messages are created: REPT EVT.

Enablers:

Non-blocking switch unit in each I/O shelf can connect each output to any input. Every tributary in each port in each slot can be connected to any other within the shelf.

Integrated NE architecture allows any supported type of port unit in any slot. Each port unit may have a different number of ports and a different total capacity: OC-48/STM-16o (1 port, 48 STS-1 eqv. capacity per 2 slots), OC-12/STM-4o (2 ports, 24 STS-1 eqv. capacity per slot), OC-3/STM-1o (4 ports, 12 STS-1 eqv. capacity per slot), and DS3/EC-1 (8 ports, 8 STS-1 eqv. capacity per slot).

Integrated NE architecture allows the multiple ports per optical port unit to be protected independently (e.g., connected to different equipment) and with different types of protection (2-Fiber BLSR/MS-SPRing, 4-Fiber BLSR/MS-SPRing, 1+1, 1×N). Individual ports can also be left unprotected.

Integrated NE architecture allows all supported types of line protection to be provisioned independently for each port on an optical port unit and without unnecessary restrictions on slot location or on mixing within a shelf.

Integrated NE architecture allows the provisioning of port protection groups to determine the transmission connectivity required for all supported types of line protection.

Integrated NE architecture allows user to establish a port protection group by selecting the type of protection, selecting the required number of ports from different optical port units in the shelf, assigning the ports to each of the required roles (working, protection) for the selected type of protection, and provisioning any operational parameters.

Protection options, behavior and reporting are dependent on port provisioning for either SONET or SDH.

Figure 5:
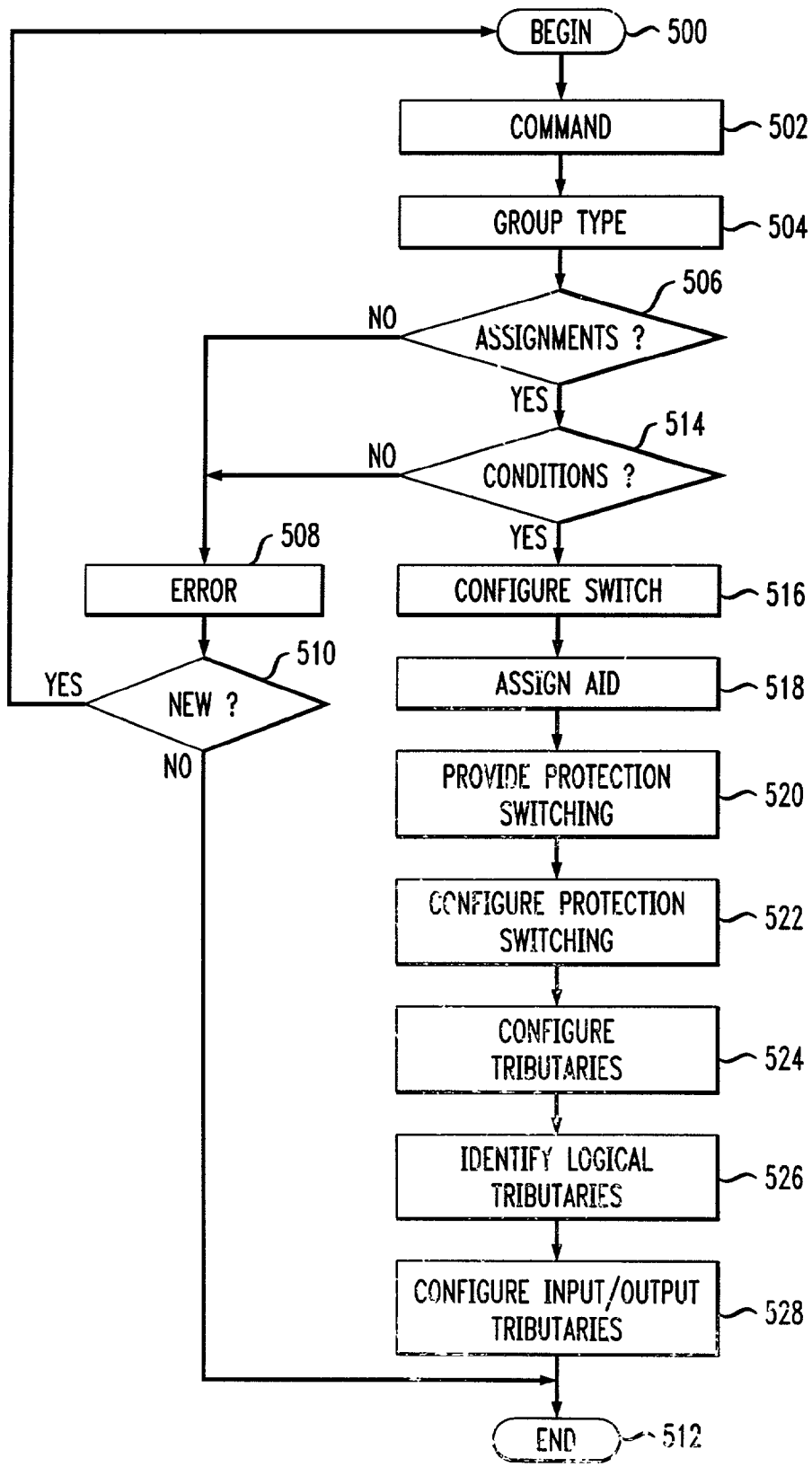
FIG. 5 is a flow chart of a process by which a user may establish a port protection group.

The flow chart of FIG. 5 illustrates the process a user employs to establish a port protection group in accordance with the principles of the present invention. The process begins in step 500 and proceeds from there to step 502 where a user enters a command (ENT-PROTN-GRP, in this illustrative embodiment) to establish or modify a port protection group. From step 502 the process proceeds to step 504 where the NE controller determines the desired group type, as indicated by the parameters of the user command. As previously described, the group type may be two-fiber BLSR, four-fiber BLSR, 1+1 protection, or 1×N protection.

From step 504 the process proceeds to step 506 where the controller determines whether port assignments are appropriate for the desired protection group. That is the controller determines whether, for a two-fiber BLSR group there are two ports assigned, one east and one west. For a four-fiber BLSR the controller determines whether there are two ports assigned as west working (WW) and west protection (WP), or as east working EW and east protection (EP) or four ports assigned as WW, WP, EW, and EP. For a 1+1 group, the controller determines whether there are two ports assigned as working and protection, and for a 1×N group the controller determines whether 2 through N+1 ports are assigned as 1 through N and P (protection). The minimum number of ports that can be assigned is 2, one working and one protection, and the maximum number of working ports supported in this embodiment, is N+1, where N is the maximum number of ports supported by the system for 1×N protection. If the port assignments are not appropriate, the process proceeds to step 508 where the controller flags an error and from step 508 to step 510 where the controller awaits input from the user. The input, or lack thereof, may cause the process to return to step 500 or to proceed to end in step 512.

If, on the other hand, the port assignments are appropriate, the process proceeds from step 506 to step 514 where the controller determines whether there are unallowable conditions imposed by the system upon the selected ports. For example, if the ports have different rates, such as OC-48 and OC-12, and therefore can not protect one another. Or if the type of protection is not supported at this rate, such as the case when all ports are OC-3 but BLSR is not supported at OC-3. If there is an unallowable condition imposed upon a port, the process proceeds to step 508 and, from there, as previously described. If no unallowable conditions are imposed upon pods, The process proceeds to step 516, where the controller configures protection switching for the ports, depending upon the protection group type and whether the traffic is SONET or SDH. For example, if the group is a two-fiber BLSR, the controller configures protection for a two fiber BLSR/MS-SPRing; if the group is a SONET four fiber BLSR, the controller configures protection switching for a four-fiber BLSR; if The group is an SDH four fiber BLSR, the controller configures protection switching for four-fiber MS-SPRing, normal or transoceanic protocol, and so on.

After configuring protection switching in step 516 the process proceeds to step 518 where the controller assigns an access identifier (AID) to the port protection group. In an illustrative embodiment, the AID concatenates a bay AID, a shelf AID, and a protection group ID. The protection group ID consists of the group type, for example, "f" for a four-fiber BLSR, and a multi-digit ID assigned by the user. From step 518, the process proceeds to step 520 where the controller is configured to provide independently operated protection switching for this port protection group. From step 520 the process proceeds to step 522 where the controller configures the protection switching for the port protection group, including the applicable protection switching options. Such options might include revertive or non-revertive for 1+1 protection, for example, accounting for any applicable options the user has chosen. The applicable states for the type of line protection switching are also configured and these include:

for 2F: idle, ring switch (either side), pass-through;
for 4F: idle, span switch (either or both sides independently), ring switch (either side), pass-through
for 1+1: working line active, protection line active
for 1×N: idle, switch for line n From step 522 the process proceeds to step 524, where the NE controller configures the physical working and protection tributaries in the assigned ports, based on their assigned west/east and/or working/protection roles. For a two fiber BLSR, half of the tributaries in each line are used as working and half are used as protection. From step 524 the process proceeds to step 526 where the NE controller identifies logical tributaries for each working input and output port tributary. That is, the controller assigns logical tributary behaviors to working input and output port tributaries. This operation is both a mapping and an identification of which port tributaries will have logical tributaries associated with them and which will not. Consequently, each tributary's behavior is based on how it is identified (e.g., whether to allow monitoring and cross-connections on the tributary and how to configure it in the next steps, depending if working or protection in certain types of groups). This assignment of logical tributary behaviors, this mapping of logical to port tributaries, permits a user to monitor and cross-connect from any port to any other port, using the abstraction of logical tributaries, thus freeing the user from the necessity of tracking details, such as switching status, whether a port associated with a particular port tributary is a member of a port protection group, what type of port protection group a port tributary is a member of, the state of protection switching, or other such details. The controller also assigns logical tributaries for each protection input and output port tributary, and the group is a two-fiber BLSR, a four fiber BLSR, or a 1×N (if the NE is configured to support protection access for this type of group).

From step 526, the process proceeds to step 528 where the controller configures path-level signal monitoring on each of the input tributaries in these ports and configures the maintenance signal ("Unequipped") transmitted on each of the output tributaries in these ports. The path level signal monitoring on each of the input tributaries is configured based on the provisioning of the port for fixed rate operation with provisioned tributary rates or adaptive-rate operation, the provisioning of the port protection group, the working or protection role of tributaries, and the current state of the line protection switching. The maintenance signal transmitted on each of the output tributaries is based on the provisioning of the port for fixed rate operation with provisioned tributary rates or adaptive-rate operation, the provisioning of the port protection group, the working or protection role of the tributaries, and the current state of the line protection switching. When a protection port tributary would be used to carry working traffic but the currently protected logical output tributary is not used for a cross-connection, an "Unequipped" signal at the same rate as the one transmitted for the logical output tributary is transmitted on that protection port tributary. Fault and performance monitoring results reflect the active path (working or protection) through the port protection group. When a port protection tributary is being used to carry working traffic, the provisioned monitoring behavior (fixed- or adaptive-rate, thresholds, etc.) is inherited from that of the currently protected working tributary. From step 528 the process proceeds to end in step 512.

The integrated NE supports path protection groups that are provisioned generically as a part of an atomic cross-connection topology. A Path Protection Group provides path-level protection switching for the one or more constituent signals (e.g., STS-1) carried by a path-protected cross-connection. A path-protected cross-connection is one of three atomic cross-connection topologies which can be used in combination—for each direction of two-way traffic and with the capability of bridging connections from an input tributary to more than one output tributary—to provide the complex sets of connections required for the many, varied applications which involve some form of path protection.

These three atomic topologies are: point-to-point (consisting of one leg from an input tributary to an output tributary), path-protected (consisting of a working leg, a protection leg, and a path-protection group, which provides for the selection of the constituent signal(s) from either of two input tributaries to an output tributary), and adjunct path-protected (consisting of a working leg and a protection leg from the same input tributaries as an existing path-protection group to a different output tributary). Each path protection group is also provisioned individually for the protection switching behavior (e.g., non-revertive, no holdoff time) required for the application.

By supporting path protection as part of an atomic cross-connection topology and with generically provisioned protection behavior, the integrated NE enables the user to provision circuits for many, varied applications involving path protection. These applications include dual node ring interworking (protected interconnections between various combinations of BLSR/MS-SPRing and UPSR rings, using either the drop-and-continue method or the dual transmit method and either the working or protection bandwidth in each BLSR/MS-SPRing, and including rings in the same network element) as well as UPSR rings themselves. The user (or user interface equipment) provisions a set of one-way atomic cross-connections with the required combination of topologies and connectivity for the application. For example, to add and drop a circuit from a UPSR ring requires a path-protected connection in the drop direction and two, bridged point-to-point connections in the add direction. To interconnect a circuit directly from one UPSR ring to another UPSR ring (but without the protection of dual node ring interworking, a path-protected connection and an adjunct path-protected connection are bridged together in each of the two directions; thus, the output of a single path protection group in each direction is first selected from a pair of tributaries in one ring and then bridged into a pair of tributaries in the other ring.

The user can also combine path protection with any ports and any type of line protection (i.e., network configuration) to support advanced network topologies such as Logical Ring applications within a single network element. For a UPSR ring, most or all tributaries in a given pair of ports are path-protected, and unprotected ports at the same optical rate are typically used. Alternatively, for a Logical Ring (which carries path-protected traffic through a BLSR or generally any network), each path-protected circuit can be individually routed, and the ports may be in a BLSR port protection group, for example, or not even at the same optical rate.

As for a point-to-point cross-connection, any input tributary for a path-protected cross-connection can be rolled (changed from one input to another while in-service). Each atomic topology can be converted to another while in-service to add or remove path protection. The working and protection input tributaries of a path protection group can be swapped (interchanging their roles while in-service).

The cross-connection rate (e.g., STS-12) of a path protected cross-connection (and its path protection group) can be higher than the constituent signal rates (e.g., a mix of constituents signals at the STS-1 and STS-3c rates) when the integrated NE supports "adaptive-rate tributary operation." In this case, the cross-connection may carry more than a single constituent signal, and the path protection group may provide an independent path selector at the constituent signal rate for each constituent signal. The path protection group adapts to the current constituent signal rates.

Figure 6:
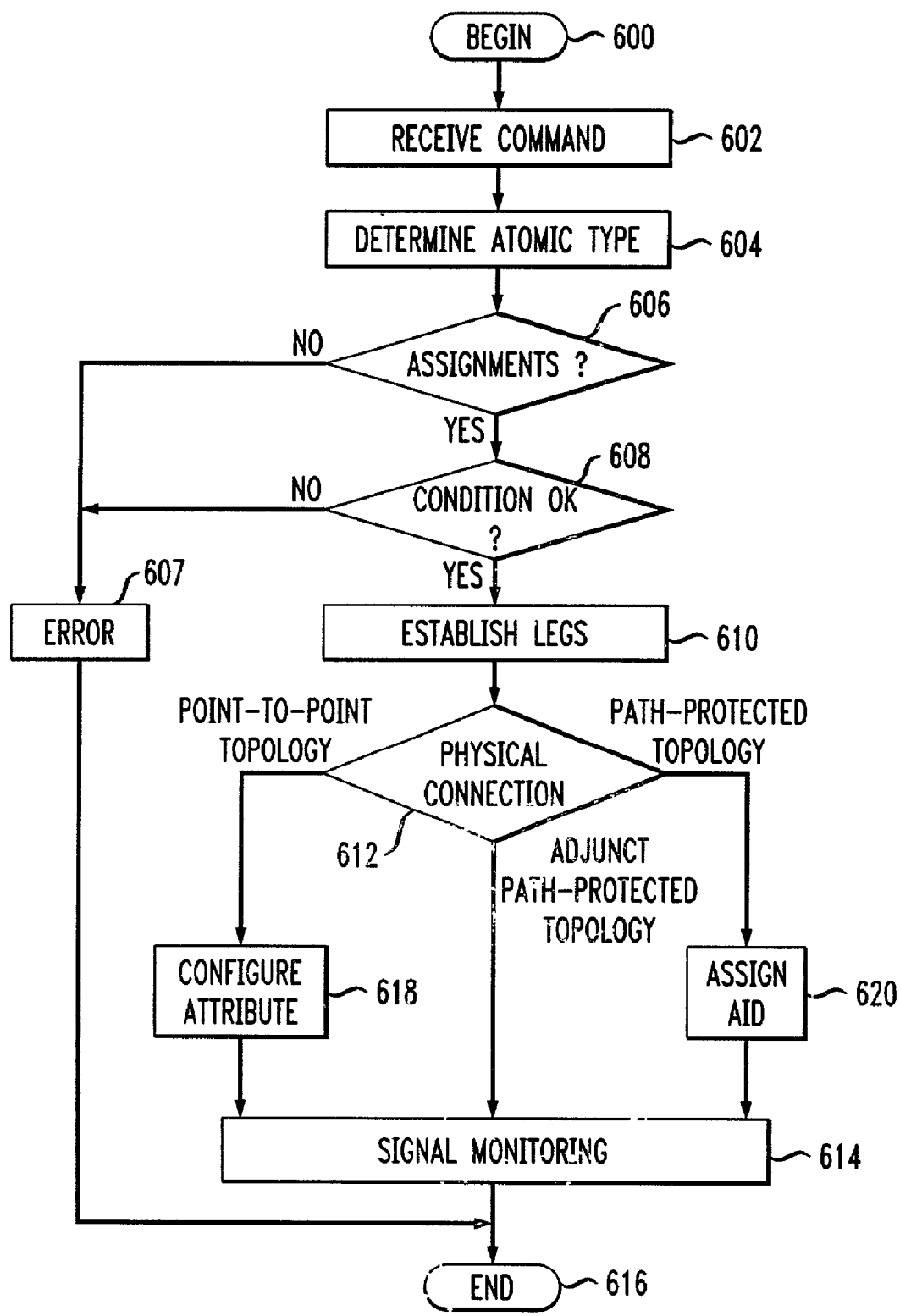
FIG. 6 is a flow chart of a process by which a user may establish a cross-connection.

The integrated NE to supports path protection groups which are provisioned generically as part of an atomic cross-connection topology:

a) the provisioning of a path-protected atomic cross-connection containing a path protection group, in combination with other cross-connections (bridged from the same inputs to different outputs and/or connected between inputs and outputs in the opposite direction) to provide the complex sets of connections required for multiple, different applications b) the adjunct path-protected atomic cross-connection topology providing additional outputs from an existing path protection group while maintaining the operation of the single path protection group c) the provisioning of path-protected and adjunct path-protected cross-connections with each input or output in any port, combined with any type of line protection d) rolling either input tributary of a path-protected cross-connection e) interchanging the working and protection roles of the inputs of a path-protected cross-connection f) converting from each atomic topology with the above capabilities to another g) provisioning a path protection group for its protection switching behavior (revertive or non-revertive, enable or disable a holdoff time)

h) a path protection group's ability to adapt to the current constituent signal rates and to provide an independent path selector at the constituent signal rate for each constituent signal The flow chart of FIG. 6 depicts the process whereby a user employs a command (ENT-CRS in this illustrative embodiment) to establish a cross-connection. The process begins in step 600 and proceeds to step 602 where the NE controller receives the ENT-CRS command. From step 602 the process proceeds to step 604 where the controller determines which of the three atomic topologies (that is, point-to-point, path protected, or adjunct path protected) is appropriate for the received request. From step 606 the process proceeds to step 608 where the integrated NE controller determines whether the proper inputs have been assigned (e.g., two inputs assigned as working and protection for a path protected topology or two inputs and an output of an existing path protection group identified for an adjunct path protected topology). If none of the three atomic topologies is cited in the command, the process proceeds to step 607 where an error is flagged and correction from the user is allowed. If no correction is received from the user, the process proceeds to end in step 616. From step 608 the process proceeds to step 610, where the controller determines whether any conditions on the related tributaries are not allowed. If there are unallowable conditions, the process proceeds to step 607, and from there as previously described. If there are no unallowable conditions, the process proceeds to step 610 where the cross-connection legs are established. Two one-way point-to-point cross-connection legs in opposite directions are established for a two way point-to point atomic topology, one point to point leg is established for a one way point-to-point topology, one-way path protected cross connected legs(working and protection) are established for a path protected topology, and one-way adjunct path protected cross-connection legs (working and protection, an additional output from an existing path protection group) is established for an adjunct path-protected topology. In the case of a path protected topology, a path protection group is also established and the path protection switching behavior is initialized according to provisionable parameters.

From step 610 the process proceeds to step 612 where the physical connectivity is configured. The controller configures the physical connectivity directly from the input port tributary(ies) to the output port tributary(ies) associated with the input and output logical tributaries used in the established cross-connection, based on the cross-connection rate, the cross-connection output mode (e.g., normal or unequipped), and the provisioning and current state of the port protection groups (if any, for each logical tributary). The controller also takes into account the current state of path protection for the adjunct path-protected topology. For a path protection topology, the working input remains active until the path protection starts operating. From step 612 the path diverges, depending upon the atomic topology. That is, for an adjunct path-protected topology, the process proceeds from step 612 to step 614, where the controller configures DS3 signal monitoring if the output of the cross-connect is a DS3 port. From step 614 the process then proceeds to end in step 616. If the cross-connection is a point-to-point topology, the process proceeds from step 612 to step 618 where the controller configures the service-affecting attribute of path-level signal alarms associated with each input logical tributary used in the established cross-connection, based on the provisioning and current state of the port protection groups (if any, for each logical tributary). Alarms on the logical tributary are service-affecting. From 618 the process proceeds to step 614, and from there as previously described.

If the cross-connection is a path-protected topology, the process proceeds from step 612 to step 620 where the controller assigns the access identifier (AID) for this path protection group, which is the same as the AID of its logical output tributary. The controller is configured to provide independently operated protection switching for this path protection group and the protection switching for this path protection group is configured to include the applicable protection switching options (e.g., revertive or non-revertive) and the states for path protection switching: working input logical tributary active, or protection input logical tributary active. A constituent path selector (possible more than one within the path protection group if the input ports are provisioned for adaptive-rate operation) is configured to provide independent path protection for each of the constituent signals at the constituent signal rate. The physical connectivity will now also depend on the current state of the path protection. The controller configures the service-affecting attribute of path-level signal alarms associated with each input logical tributary used in the established cross-connection, based on the provisioning and current state of the port protection groups (if any, for each logical tributary) and also based on the current state of the path protection group. Alarms on the logical tributary are service-affecting when it is selected as the active path. From step 620 the process proceeds to step 614, and from there as previously described.

A user may employ a command (ENT-CRS in an illustrative embodiment) to establish a path-protected cross-connection with generic connectivity (with two inputs and an output from/to any tributary in any port with any type of port/line protection, i.e., network configuration) and with user-selected path-protection behavior (revertiveness and holdoff timer enable). This also automatically establishes a path protection group.

The DLT-CRS command allows the user to delete any path protected cross-connection. This also automatically removes a path protection group that was created via ENT-CRS.

The ED-PROTN-GRP command allows the user to edit the switching parameters of a path protection group for various applications.

The RTRV-PROTN-GRP command allows the user to retrieve the provisioned information for a path protection group(s) as well as the current status information such as the path protection switching state.

Switching in a path protection group from a working path to a protection path, or vice versa, is controlled by physical events such as a failure. In addition, the OPR-PROTNSW and RLS-PROTNSW commands can be used to cause a protection switch in a path protection group(s) and/or its constituent path selector(s). When there is a protection switch state change, autonomous messages are created: REPT EVT.

The ENT-ROLL command allows the user to roll the input of an existing leg of a cross-connection from a given tributary to another tributary, while leaving the output unchanged.

The CNVT-CCT command allows the user to convert from one atomic cross-connection topology to another while in-service to add or remove path protection.

The OPR-WKGLEG command allows the user to interchange the roles of the working and protection input tributaries of a path protection group while in-service.

Path Protection Groups which are provisioned with variable protection switching behavior and as part of an atomic cross-connection topology enable the user to provision circuits for many, varied applications involving path protection. Additional development for each application is needed only in the user interface equipment or procedures, not in the network elements. The use of the atomic cross-connections also provides the flexibility to bridge-and-roll individual circuits and to add or remove path protection for individual circuits in all applications. The ability to independently combine path protection and any type of line protection enables advanced networking capabilities—especially when coupled with universal cross-connectivity between different types of networks in the same network element, while still maintaining efficient and flexible port utilization.

The above advantages are the result of this method for consolidating into each single network element the UPSR ADM functionality (and path protection in general) with both DCS and BLSR ADM functionality.

A Logical Tributary is a unit of path-level bandwidth for a circuit in a given protection/network configuration, not just in the physical equipment. An integrated NE in accordance with the principles of the present invention supports logical tributary addressing consistently for all operations, regardless of line protection switching.

A logical tributary is used as the address in command/response messages, consistently for all types of user operations at the path-level: cross-connections (including cross-connect loopbacks and test access), path-level signal monitoring (both provisioning and reporting), and path protection switching. The user can provision cross-connections from and to the tributaries in optical ports that are in a port protection group if they are working tributaries or if they are protection tributaries supporting protection access traffic; these are the tributaries which support circuits in the absence of a line protection switching event. The user can also provision the incoming path-level fault and performance monitoring behavior for these same tributaries. The integrated NE automatically takes into account, for any optical interface port, the type of line protection and the current state of the line protection switching—both in making the actual physical cross-connections and in reporting the results of fault and performance monitoring. The reported results of monitoring reflect the active (selected) path through the input port protection group, which may be either a working or protection port tributary from which a circuit (path) is currently received. When the results are from a protection port tributary used to protect working traffic, the provisioned monitoring behavior is inherited from that provisioned for the currently protected working tributary.

The integrated NE supports a method of tributary addressing which:
a) is consistent for all user operations: cross-connections, path-level signal monitoring (provisioning and reporting), and path protection switching;
b) is independent of the type of line protection (network configuration) and the current protection switching state;
c) reflects the monitoring behavior provisioned for the tributary normally used to receive a circuit and also the current results for that circuit, regardless of the current protection switching state.

Figure 7:
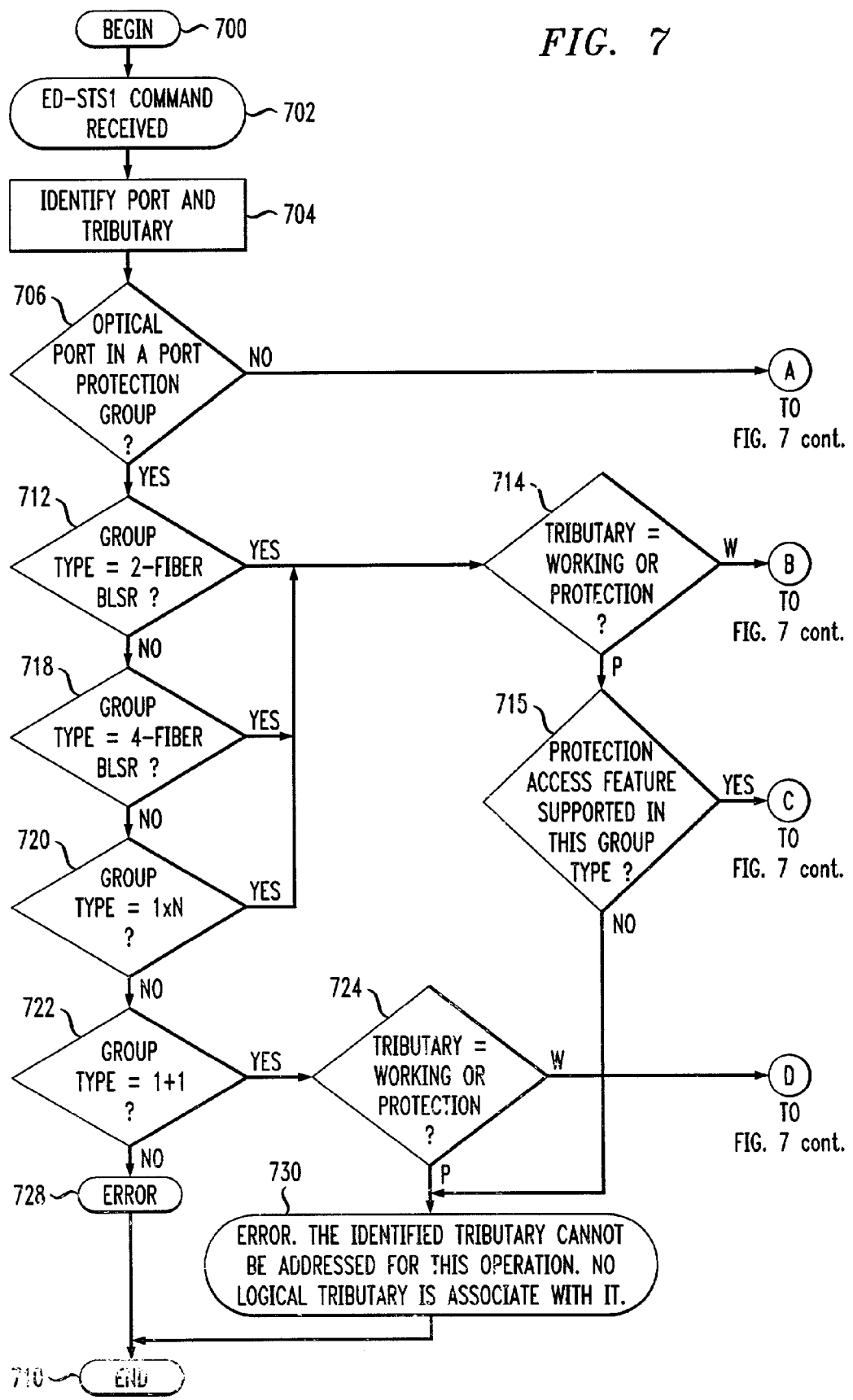
FIG. 7 is a flow chart of a process by which a user may modify the provisioning of a logical tributary.
Figure 7:
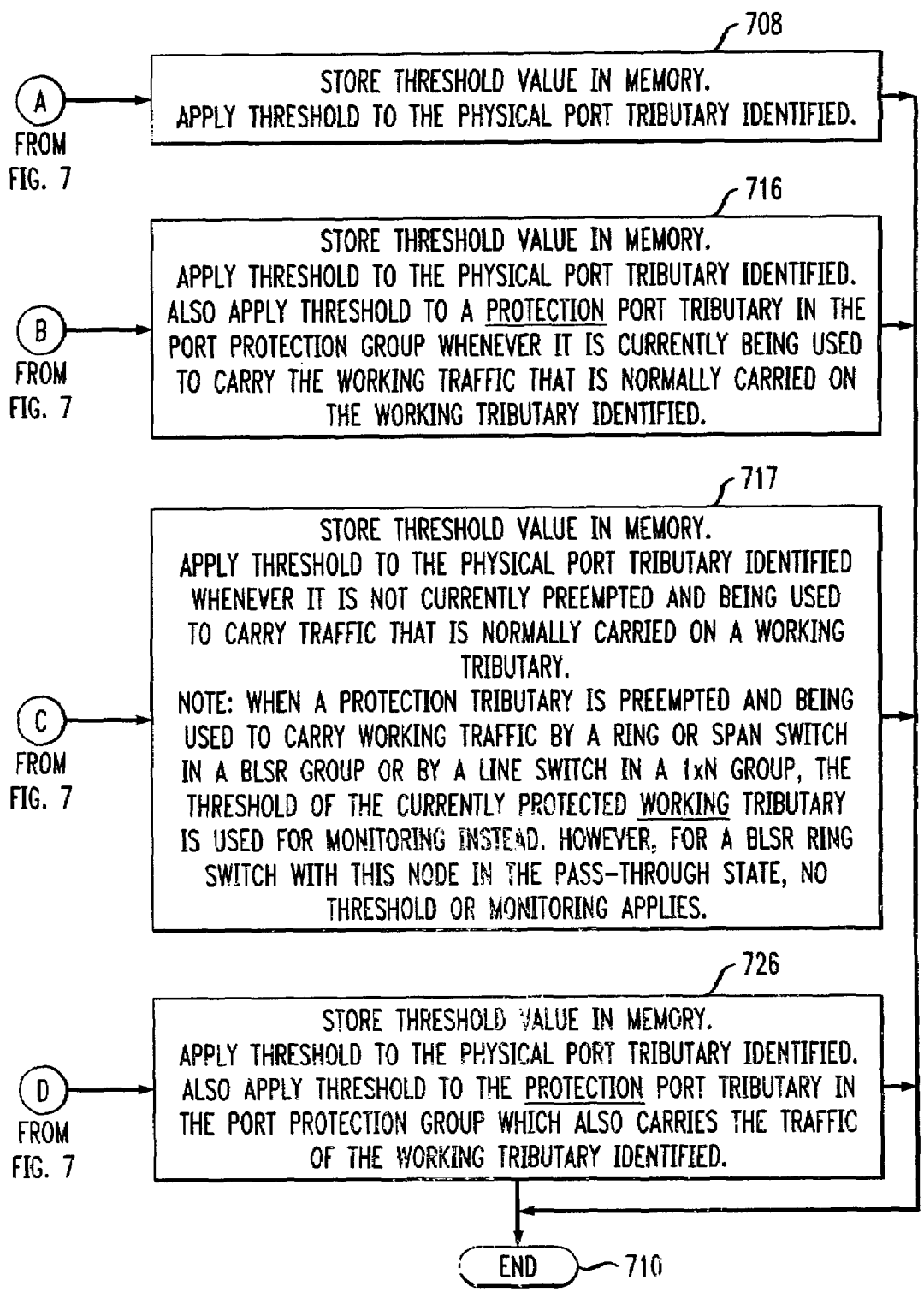

The flowchart of FIG. 7 illustrates the process by which a user employs a command (ED-STS1 in this illustrative embodiment) to modify the provisioning (such as the Bit Error Rate threshold used for path level monitoring) for a logical tributary. The process begins in step 700 and proceeds from there to step 702 where the integrated NE controller receives the ED-STS1 command. The process then proceeds to step 704 where the controller identifies the port and tributary for which the user is modifying the provisioning. From step 704 the process proceeds to step 706 where the controller determines whether the optical port is a member of a port protection group. If the it is not a member of a port protection group the process proceeds to step 708 where the controller stores the bit error rate (BER) threshold value in memory and applies the threshold to the physical port tributary identified in step 704. From step 708 the process proceeds to end in step 710.

If the controller determines in step 706 that the optical port is a member of a port protection group, the process proceeds to step 712 where the controller determines whether the group is a two-fiber BLSR and, if so, the process proceeds to step 714 where the controller determines whether the tributary is working or protection. If the tributary is a working tributary the process proceeds to step 716 where the controller stores the threshold value in memory and applies the threshold value to the physical port tributary identified in step 704. In step 716 the controller also applies the threshold to a protection port tributary in the port protection group whenever it is currently being used to carry the working traffic that is normally carried on the identified working tributary. From step 716 the process proceeds to end in step 710. If, in step 714 the controller determines that the tributary is a protection tributary, the process proceeds to step 715 where the controller determines whether the protection access feature is supported within the port protection group identified in step 706 and, if so, the process proceeds to step 717 where the processor stores the threshold value in memory and applies the threshold to the physical port tributary identified whenever it is not currently preempted and being used to carry traffic that is normally carried on a working tributary. When a protection tributary is preempted and being used to carry working traffic by a ring or span switching in a BLSR group or by a line switch in a 1×N group, the threshold of the currently protected working tributary is used for monitoring instead. However for a BLSR ring switch with this node in the pass-through state, no threshold or monitoring applies. From step 717 the process proceeds to end in step 710. If, in step 715 the controller determines that protection access feature is not supported in this group type, the process proceeds to step 730 where an error is flagged since no logical tributary is associated with the identified tributary and it cannot be addressed for this operation. From step 730 the process may await further user input or proceed to end in step 710.

If the controller determines in step 712 that the port protection group is not a two-fiber BLSR, the process proceeds to step 718 where the controller determines whether the group is a four-fiber BLSR and, if it is, the process proceeds to step 714 and from there as previously described. If in step 718 the controller determines that the group is not a four-fiber BLSR, the process proceeds to step 720 where the controller determines whether the group is a 1×N port protection group and, if so, the process proceeds to step 714 and from there as previously described. If the controller determines in step 720 that the group is not a 1×N port protection group, the process proceeds to step 722 where it determines whether the group is a 1+1 protection group and, if not, it proceeds to step 728 where it flags an error and then to end in step 710. If the controller determines in step 722 that the group is a 1+1 protection group, the process proceeds to step 724 where the controller determines whether the tributary is working or protection. If the tributary is protection, the process proceeds to step 730 and from there as previously described. If the tributary is working, the process proceeds from step 724 to step 726 where the controller stores the threshold value in memory and applies the threshold value to the physical port tributary identified in step 704. In step 726 the controller also applies the threshold to the protection port tributary in the port protection group which also carries the traffic of the working tributary identified. From step 726, the process proceeds to end in step 710.

For a port that belongs to a port protection group, logical tributaries are distinct from port tributaries and may be different depending on the state of the line protection switching. The logical input tributary is the location of the alarm issue point for SONET and SDH path layer faults and for path protection switching. Logical Tributary addressing, which reflects a unit of path-level bandwidth for a circuit in a given protection/network configuration, not just in the physical equipment, enables user operations to be addressed consistently, independent of the type of protection (network configuration) or the current protection switching state.

The integrated NE supports port and tributary addressing based on both equipment and network information. The address format used in command/response messages (AIDs, or Access IDentfiers) for ports and tributaries includes information fields for the physical location in the network element equipment (port unit slot in the shelf, port within the port unit) and also for the logical location in the network configuration (port protection group in the shelf; west/east ring-side and/or working/protection line within the port protection group). The latter represents the way the port or tributary has been provisioned to be used as bandwidth for a circuit in a specific network configuration.

The integrated NE accepts commands addressed to ports or tributaries for which the user has entered either (or both) the physical equipment location fields or the logical network configuration fields. The integrated NE reports information to the user by filling both sets of fields in the port or tributary AID. The user (including user interface equipment) can then identify, select, sort, and correlate the information from either or both points of view, the equipment in the network element or the bandwidth for a circuit in the network. For example, a port can be associated with other ports in the same port unit slot as well as with other ports in the same port protection group.

The integrated NE supports an address format which:
a) consistently for all ports and tributaries provides both equipment and network information to the user
b) allows the user to identify ports and tributaries by entering either (or both) the equipment or network information Returning, momentarily, to FIG. 4 where port protection groups, ports, tributaries, and cross-connections are illustrated in terms of a functional view of the transmission part of a network element The operations applying to each entity are shown. The relationships between entities in this functional view are important for correlating information regarding line-level fault and performance monitoring, path-level fault and performance monitoring, cross-connections, line protection switching, and path protection switching.

Each entity in the transmission part of the system has a place both in a functional view and in a hierarchy upon which AIDs need to be based. Each instance of these entities is identified uniquely, and is identified consistently for all operations. The content of the AIDs themselves enable the user to identify entities that are at lower or higher levels in the hierarchy and to correlate information about them.

Line protection switching commands and notifications identify a port protection group, and in some cases the specific ring-side or line in the port protection group.

Most operations at the path level (notably, path-level FM/PM and cross-connections) are addressed to logical tributaries, as opposed to port tributaries. The two are different entities if the tributary is in port protection group (line protected). The AID for a logical tributary must identify the port tributary which is used for transmission NORMALLY, in the absence of a line protection switching event, to carry a particular service (unit of traffic) from/to another network element(s). The actual connectivity during line protection switching depends on the provisioning and current state of the port protection group.

When ports are provisioned to be part of a port protection group (i.e., network configuration), these ports and their tributaries are hierarchically a part of the port protection group as much as they are also a part of a port unit (slot). The way a port or tributary is used in a network configuration is a necessary part of its identity in many operations, as is its physical location in the equipment.

Once a port has been provisioned for use in a network configuration (port protection group), the AIDs of the port and its tributaries must not change as long as this port's role in the network configuration is not changed.

The system identifies ports and tributaries in terms of both the physical location in the equipment (slot-port) and the logical location within a set of interfaces that carry services to another network element (port protection group, ring-side, line). This makes such AIDs more informative to the user, allowing the user to identify, select, sort, and correlate the information from the point of view of either the equipment in the network element or the services in the network.

The user must be able to enter port and tributary AIDs in an abbreviated form, using either the port protection group or the physical slot-port (or in the complete form with both). For an electrical or unprotected optical port, there is no port protection group and the physical slot-port must be entered.

Returning to FIG. 3, which illustrates the need for both of the two views, the "Network Element/Equipment" view and the "Network Configuration/Services" view. This need for both views becomes particularly important for these network elements because each integrated NE can support: more than one ring; universal port-unit slots; multiple, independently protected ports on optical port units; and provisionable mixing of line protection (network topologies). The economic benefits of these capabilities must be accompanied by an ease of use. Note in the figure that an OC-12 port can be viewed either in association with other ports in the same slot (a "vertical" slice of the equipment view) or in association with other ports in the same port protection group (a "horizontal" slice of the equipment view). The latter is actually the network configuration/services view, and the need for this view cannot be supported by the equipment view because the two views must group different subsets of the ports.

The AID for a port protection group identifies the group by its type (e.g., "F" for Four-fiber BLSR) and by a 2-digit ID number which is unique for that type of group in that shelf. The ID number is assigned by the user when the group is established, and cannot be changed. The type determines the applicable content of the ring-side and line in the AID. The examples in FIG. 4 illustrate the AID structure containing the port protection group, ring-side and/or line, slot, and port. The AID structure for tributaries is not shown here but is the same except for the tributary number appended at the end. The AID of a port tributary and the AID of a logical tributary are differentiated by the context (commands). The AID of a logical tributary can be used also to identify (depending on the context): an input or output of a cross-connection leg; an input/output constituent signal; a path protection group; or a constituent path selector. The integrated NE architecture allows any supported type of port unit in any slot, and each port unit may have a different number of ports. The integrated NE architecture allows port protection groups of various types to be provisioned independently for the multiple ports per optical port unit and without unnecessary restrictions on slot location or on mixing within a shelf Thus, the system can support the provisionable mixing of line protection (network topologies) and more than one ring even within the same shelf. Port and tributary addressing that supports a dual, physical/logical view of both the equipment in the network element and the bandwidth for a circuit in the network configuration enables easier, consistent operations in a system that supports flexibility in mixing network configurations. Other systems support physical equipment addressing only, or a mix based on having dedicated port unit slots for the one ring (logical) and for the other ports (physical).

Figure 8:
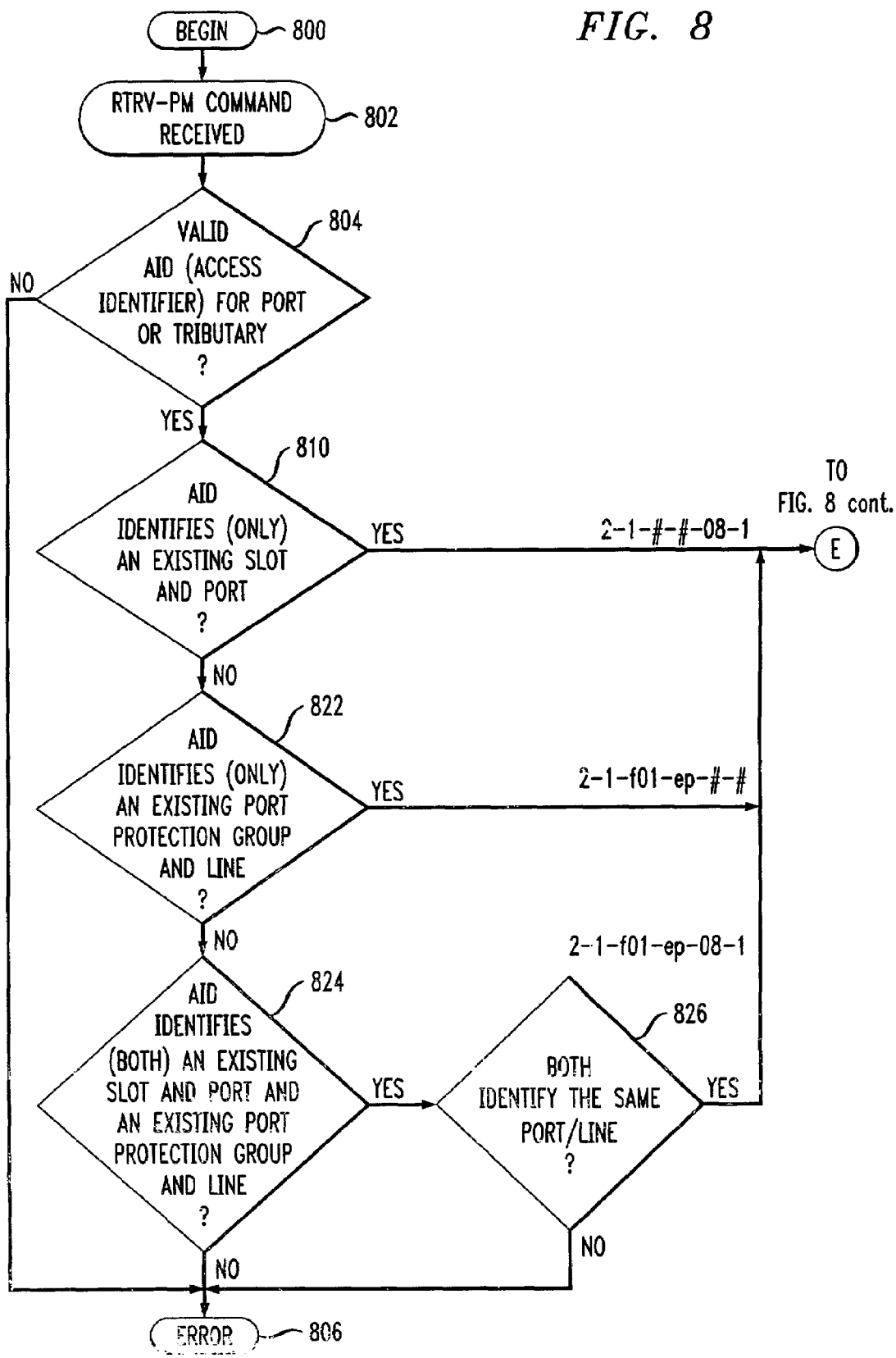
FIG. 8 is a flow chart that illustrates the process by which a user may retrieve performance-monitoring data.
Figure 8:
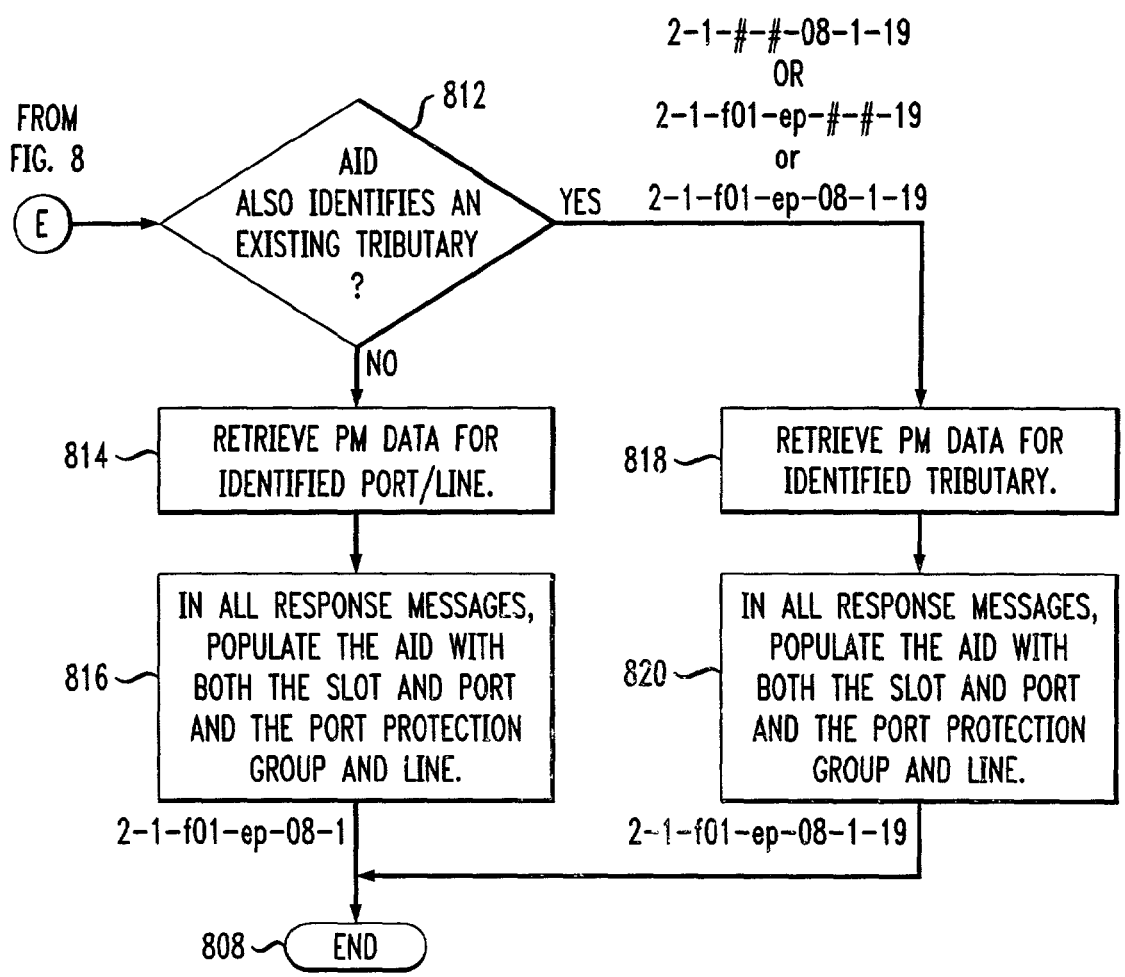

The flowchart of FIG. 8 demonstrates the process whereby a user employs a command (RTRV-PM in this illustrative embodiment) to retrieve performance-monitoring data. In this illustrative example, the user retrieves data for logical tributary 19 in a port/line identifiable as "slot 8, port 1" and/or "4 fiber BLSR port protection group 01, East Protection Line" in bay 2, shelf 1. The process begins in step 800 and proceeds from there to step 802 where the RTRV-PM command is received by the controller. From step 802 the process proceeds to step 804 where the controller determines whether the access identifier (AID) is valid for the port or tributary for which the user is attempting to retrieve performance-monitoring data. If the AID is invalid the process proceeds to step 806 where the controller provides an error indication and, if no correction action is forthcoming from the user, the process proceeds on to end in step 808. If the AID is valid the process proceeds from step 804 to step 810 the controller determines whether the AID identifies an existing slot and port only—in which case the AID does not identify a port protection group (e.g., 2-1-#-#-08-1, in which the fields for slot and port are filled with numbers, but the fields for port protection group are filled with pound signs), and, if so, the process proceeds to step 812 where the controller determines whether the AID also identifies an existing tributary.

If the existing tributary (logical tributary 19 in this example) is not identified, the process proceeds to step 814 where the controller retrieves performance-monitoring data for the identified port/line. From step 814 the process proceeds to step 816 where the controller returns the data and populates the AID with both the slot and port and the port protection group and line (2-1-f01-ep-08-1) in all response messages. From step 816 the process proceeds to end in step 808.

If the existing tributary (logical tributary 19 in this example) is identified, the process proceeds to step 818 where the controller retrieves performance-monitoring data for the identified tributary. From step 818 the process proceeds to step 820 where the controller returns the data and populates the AID with both the slot and port and the port protection group and line (2-1-f01-ep-08-1-19) in all response messages. From step 816 the process proceeds to end in step 808.

Returning to step 810, if the AID does not identify an existing slot and port only, the process proceeds to step 822 where the controller determines whether the AID identifies an existing part protection group and line only—in which case the AID does not identify a slot and port (e.g., 2-1=f01-ep-#-#, in which the fields for port protection group and line are filled with numbers, but the fields for slot and port are filled with pound signs), and, if so, the process proceeds to step 812 where the controller determines whether the AID also identifies an existing tributary.

If the existing tributary (logical tributary 19 in this example) is not identified, the process proceeds to step 814 where the controller retrieves performance-monitoring data for the identified port/line. From step 814 the process proceeds to step 816 where the controller returns the data and populates the AID with both the slot and port and the port protection group and line (2-1-f01-ep-08-1) in all response messages. From step 816 the process proceeds to end in step 808.

If the existing tributary (logical tributary 19 in this example) is identified, the process proceeds to step 818 where the controller retrieves performance-monitoring data for the identified tributary. From step 818 the process proceeds to step 820 where the controller returns the data and populates the AID with both the slot and port and the port protection group and line (2-1-f01-ep-08-1-19) in all response messages. From step 816 the process proceeds to end in step 808.

Returning to step 822, if the controller determines that the AID does not identify only an existing port protection group and line, the process proceeds to step 824 where the controller determines whether the AID identifies an existing slot and port and an existing port protection group and line and, if not, the process proceeds to step 806 and from there as previously described. If the controller determines whether that AID identifies an existing slot and port and an existing port protection group and line (2-1-f01-ep-08-1), the process proceeds to step 826 where the controller determines whether both existing slot and port and the existing port protection group and line identified by the AID identify the same port/line and, if not, the process proceeds to step 806 and from there as previously described. If both existing slot and port and the existing port protection group and line identified by the AID identify the same port/line the process proceeds to step 812, where the controller determines whether the AID also identifies an existing tributary.

If the existing tributary (logical tributary 19 in this example) is not identified, the process proceeds to step 814 where the controller retrieves performance-monitoring data for the identified port/line. From step 814 the process proceeds to step 816 where the controller returns the data and populates the AID with both the slot and port and the port protection group and line (2-1-f01-ep-08-1) in all response messages. From step 816 the process proceeds to end in step 808.

If the existing tributary (logical tributary 19 in this example) is identified, the process proceeds to step 818 where the controller retrieves performance-monitoring data for the identified tributary. From step 818 the process proceeds to step 820 where the controller returns the data and populates the AID with both the slot and port and the port protection group and line (2-1-f01-ep-08-1-19) in all response messages. From step 816 the process proceeds to end in step 808.

The integrated NE supports compound cross-connection topologies by associating and identifying atomic connections. A Compound Cross-Connection is a particular set of atomic cross-connections between input and output tributaries in a network element for a circuit in a specific network application. Each of the many applications involving path protection (UPSR, Logical Rings, and the various forms of dual node ring interworking) requires different connections. User interface equipment can enable the user to not only establish, but also display or remove a compound cross-connection as a single object. The network elements directly support only the atomic cross-connections, but they store data for each atomic cross-connection leg: a cross-connection number and a cross-connection application code. This data is used by the user interface equipment to associate and identify the atomic cross-connection legs in each compound cross-connection, so that it can then display or remove a compound cross-connection as a single object.

When a user establishes a cross-connection, the user interface equipment allows the selection of a compound cross-connection for any of the supported applications involving path protection. It decomposes the compound cross-connection into a set of atomic cross-connection commands for the network element. It includes in these commands a unique value for the cross-connection number and also a code for the selected application, i.e., the compound cross-connection topology. This data is stored and retrievable for each atomic cross-connection leg.

When a user wants to display cross-connections, the user interface equipment can first associate the cross-connection legs that have the same cross-connection number, check for a consistent application code among each set of associated legs, reference a template for the compound cross-connection topology with that application code, and then verify whether these legs fit into that template. If the legs do fit into the template, the retrieved connections can be displayed as a single, compound cross-connection for the given application. Note that the cross-connections retrieved and displayed with a single user command may also include several different cross-connection numbers, i.e., more than one compound cross-connection, as would be the case when retrieving all circuits connected to a port or ring.

Also, when a set of connections has been displayed as a compound cross-connection, the user interface equipment allows the user to remove the set of connections as a single object, and decomposes it into a set of commands for the network element. A user can change the cross-connection number for an individual leg to update the associations: for example, as part of a bridge-and-roll procedure which changes the connectivity of individual legs. A user can retrieve all cross-connection legs with a given cross-connection number, which may be correlated with a circuit identifier (such as a circuit order number) for the end-to-end circuit of which the connections in this network element are part.

The integrated NE supports a method of associating and identifying a set of cross-connections which:

a) supports the cross-connection topologies required for any and all of the applications involving path protection
b) requires no additional development in the network elements to support additional, specific applications
c) associates the connections for a given circuit, using a cross-connection number stored in the network element for each leg in a set of atomic cross-connections
d) identifies the application of a given set of connections, using a cross-connection application code stored in the network element for each leg in a set of atomic cross-connections
e) verifies whether a set of connections with the same cross-connection number and the same cross-connection application code match a template, which represents a generic description of a set of connections that could have been entered as a single set of connections for the compound cross-connection topology with that application code.
f) displays on a user interface a set of individual, atomic cross-connections for a specific application as a single compound cross-connection (i.e., the reverse process of decomposing the user's selection of a single compound connection into a set of atomic connections to be made in the network element)

The integrated NE supports compound cross-connection topologies by associating and identifying atomic connections and allows a user to establish, remove, modify, roll, convert, and retrieve cross-connections with any of 3 atomic cross-connection topologies (see above), including the cross-connection number and cross-connection application parameters for each cross-connection leg. In an illustrative embodiment, the commands are respectively entitled: ENT-CRS, DLT-CRS, ED-CRS, ENT-ROLL, CNVT-CCT, and RTRV-CRS.

With this method of supporting compound cross-connection topologies, the user interface equipment can enable the user to not only establish, but also display or remove as a single object any one of the many different, complex sets of connections needed for the various applications involving path protection (UPSR, Logical Rings, and the various forms of dual node ring interworking), while also allowing the user to manage connections at the atomic level (e.g., bridge-and-roll procedure). This method supports cross-connection operations both at a high level which is easier to understand and manage, and also at a detailed level which provides control of individual legs. Also, this method requires no additional development in the network elements (only the development in the user interface equipment) to support additional, specific applications, once they support the storage and retrieval of an application code and a cross-connection number for each connection leg.

Figure 13:
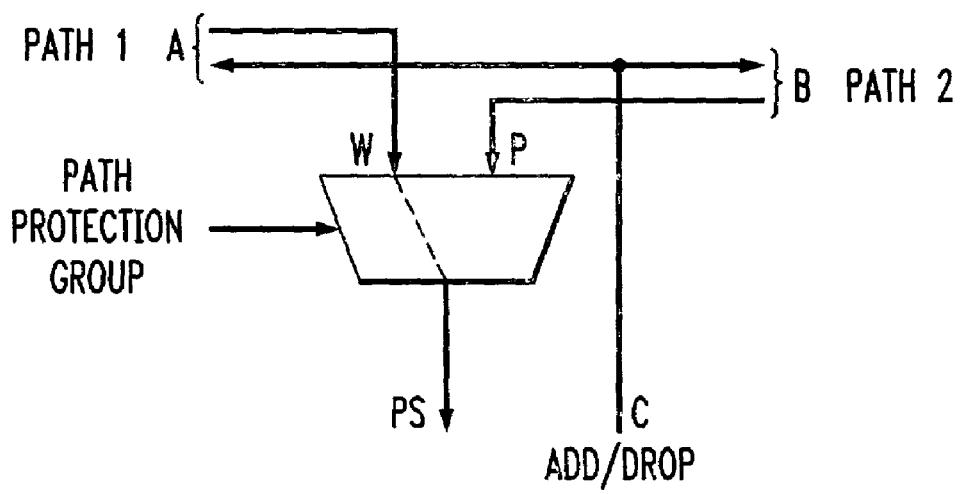
FIG. 13 is a conceptual block diagram that illustrates the components of a template displayed for the establishment of a cross-connection.

The conceptual block diagram of FIG. 13 illustrates a template displayed for the establishment of a cross-connection. The template 1300 of FIG. 13 includes the following steps:

1) establish cross-connection by, for example, selecting an application from a list, the list including atomic cross-connections. For example, an add or drop operation in a UPSR or SNCP ring.
2) select a cross-connection (XC) rate.
3) select tributary AIDs, for the tributary labels in this application: where A equals "path 1N" and B equals "path 2" (default is corresponding tributary in opposite line) and C equals "Add/Drop."
4) select a working input (A or B, the default is A in this example).
5) add other information as needed, including cross-connect number.
6) send three commands to the network element: namely, (a) establish a path-protected cross-connect, inputs from path 1 and from path 2, output to add/drop (A or B to C); (b) establish point-to-point cross-connect, input from add/drop, output to path 1 (C to A), (c) establish point-to-point cross-connect, input from add/drop, output to path 2 (C to B)

Figure 9:
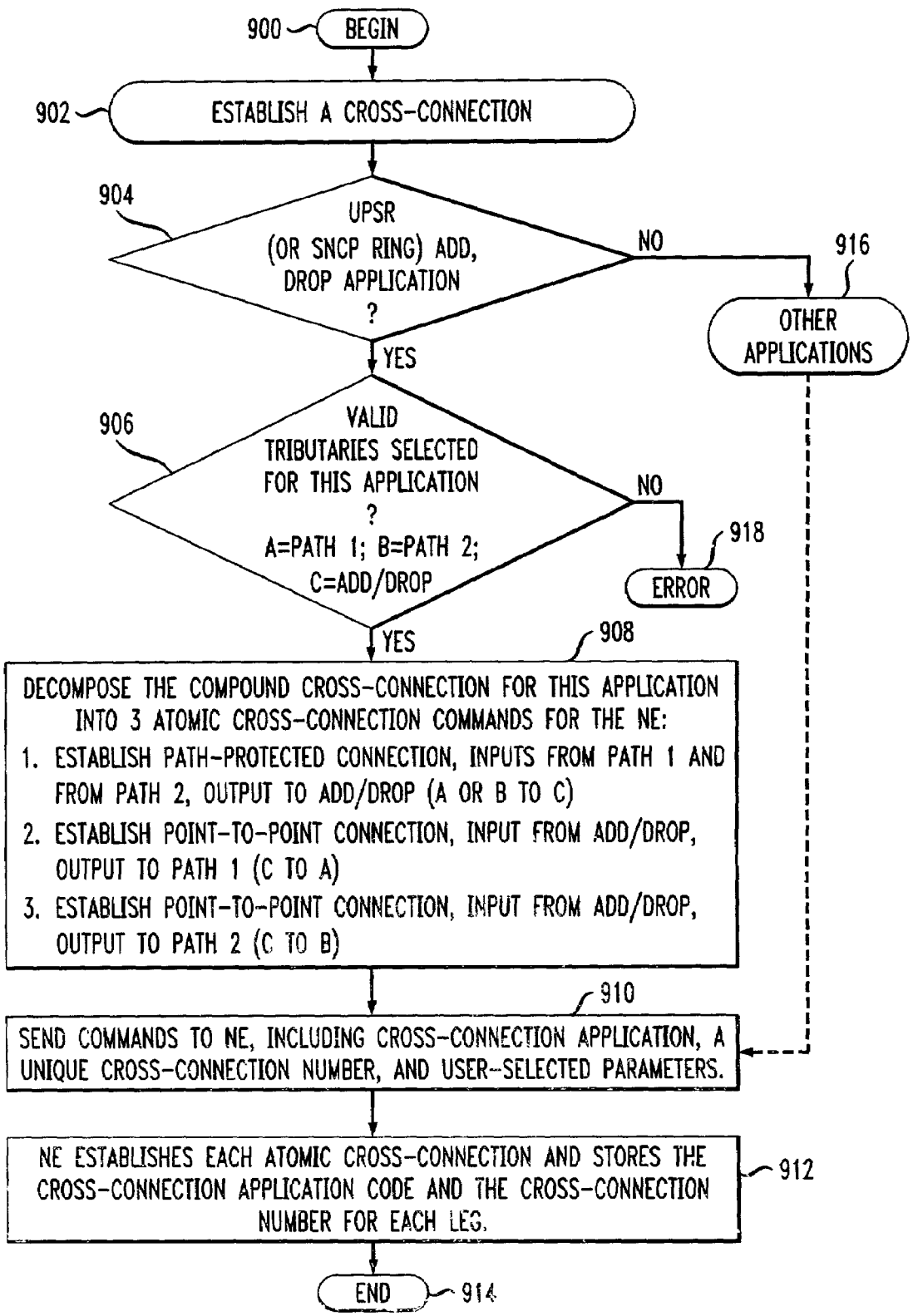
FIG. 9 is a flow chart that illustrates the process by which a user may establish a compound cross-connection.

The template guides a user through six steps (discussed in greater detail in relation to the flow chart of FIG. 9) to establish a cross-connection. The user interacts with the display to select cross-connection rate (step 2), the selection of tributary AIDs (step 3), the selection of a working input (step 4), addition of cross-connection number (and other information, as needed—step 5) and the sending of three commands to the NE (step 6).

The flowchart of FIG. 9 illustrates the process whereby a user interacts with an integrated NE to establish a compound crass-connection for the "UPSR (or SNCP Ring) Add, Drop" application (The conceptual block diagram of FIG. 13 illustrates the tributary usage and atomic cross connections established for the "UPSR(or SNCP Ring) Add/Drop" application). The process begins in step 900 and proceeds from there to step 902 where the user interface (which may, for example, be a separate application program running on a standalone computer or a part of the controller) receives an indication to establish a cross-connection and proceeds from there to step 904. In step 904, the controller determines whether the cross-connection is for a UPSR (or SNCP Ring) Add, Drop application and, if so, the process proceeds to step 906 where the controller determines whether the user has selected valid tributaries for this application and, if so, the process proceeds to step 908 where the controller decomposes the compound cross-connection for this application into three atomic cross connection commands:

1) Establish a path protected connection with inputs from Path 1 and Path 2 and an output to ADD/DROP (A or B to C)
2) Establish a point to point connection, with an input from ADD/DROP and an output to path 1 (C to A)
3) Establish a point to point connection, with an input from ADD/DROP and an output to path 2 (C to B)

From step 908 the process proceeds to step 910 where the user interface transmits the commands to the portion of the NE controller which effects the commands. The user interface also forwards the cross-connection application, a unique cross connection number and user-selected parameters. From step 910 the process proceeds to step 912 where the NE controller establishes each atomic cross-connection and stores the cross-connection application code and the cross-connection number for each leg. From step 912 the process proceeds to end in step 914. If, in step 904 it is determined that another application is to be employed, the process proceeds from step 904 to step 916 where a similar validation process, for the application, which may involve different compound cross-connections, is effected, and the process proceeds to step 910 and from there as previously described. If, in step 906, it is determined that the tributaries selected for the application are not valid, the process proceeds to step 918 where an error is flagged and, if there is no corrective action on the part of the user, the process proceeds to end in step 914.

Figure 12:
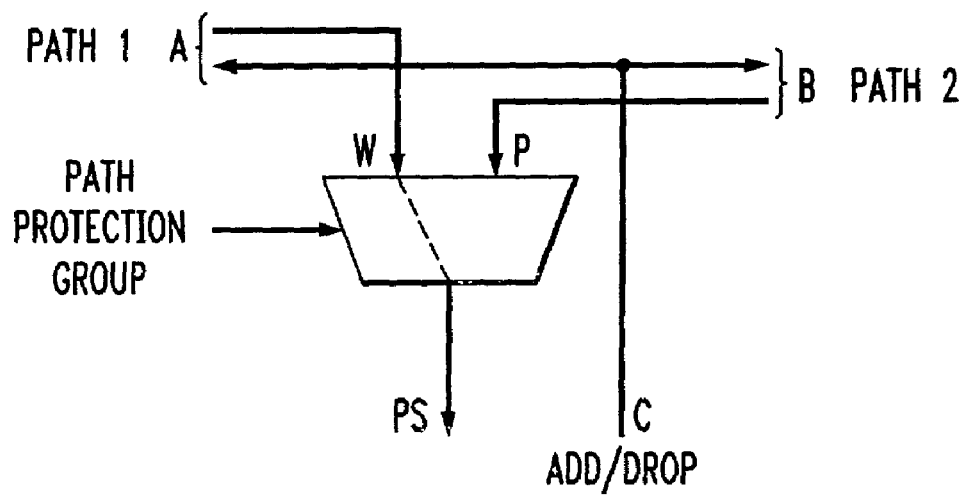
FIG. 12 is a conceptual block diagram that illustrates the constituent components of template displayed for a UPSR cross-connection.

The conceptual block diagram of FIG. 12 illustrates the constituent components of a UPSR (or SNCP Ring Add/Drop cross connection. Tributary AIDs A, B, and C are matched with respective tributary labels "Path 1", "Path 2" and "Add/Drop".
1) XC Application=UPSR (or SNCP Ring) Add, Drop
2) Expected Leg-Pairs
 A', C', 2wayPS, W
 B', C', 2WAY Ps, P
 OR
 A', C', 2wayPS, P
 B', C', 2WayPS, W
3) Match Tributary AIDs (A', B', C') to the Tributary Labels in this application:
 A="Path 1"
 B="Path 2"
 C="Add/Drop"
4) Display fields:
 XC Rate
 XC Application
 AID "Path 1"
 AID "Path 2"
 AID "Add/Drop":
 Indicate the Working input ("Path 1" or "Path 2")
 Other XC parameters The expected leg pairs are: A, C, 1wayPS,W; B,C, 1way-PS,P; C,A, 1way; and C,B, 1way. The user interface controller will also include the following display fields: cross connection rate and application, AID path 1, AID path 2, AID Add/Drop, an indication of the working input ("Path 1" or "Path 2") and other cross-connection parameters.

Figure 10:
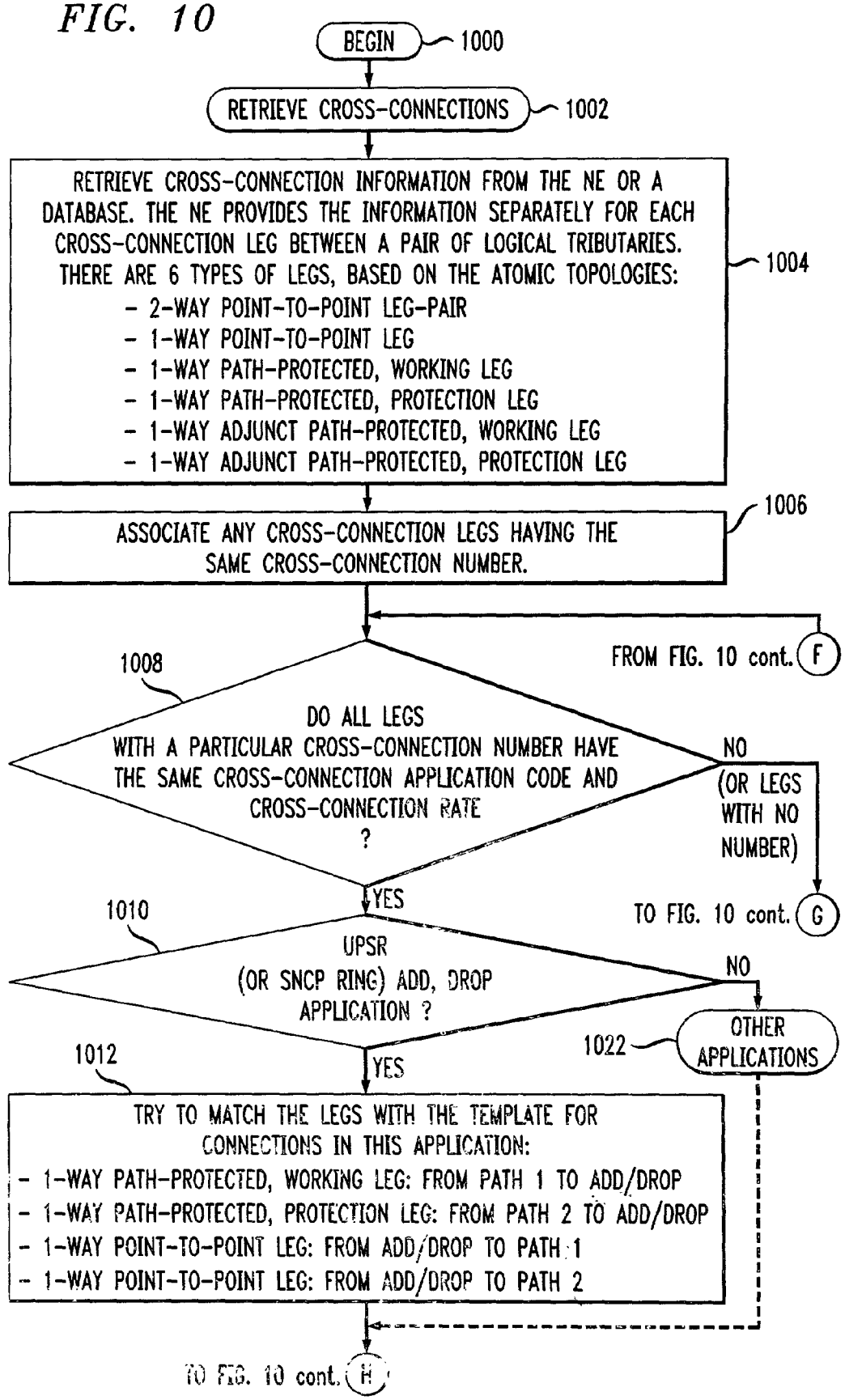
FIG. 10 is a flow chart that illustrates the process whereby a user may retrieve cross-connection information.
Figure 10:
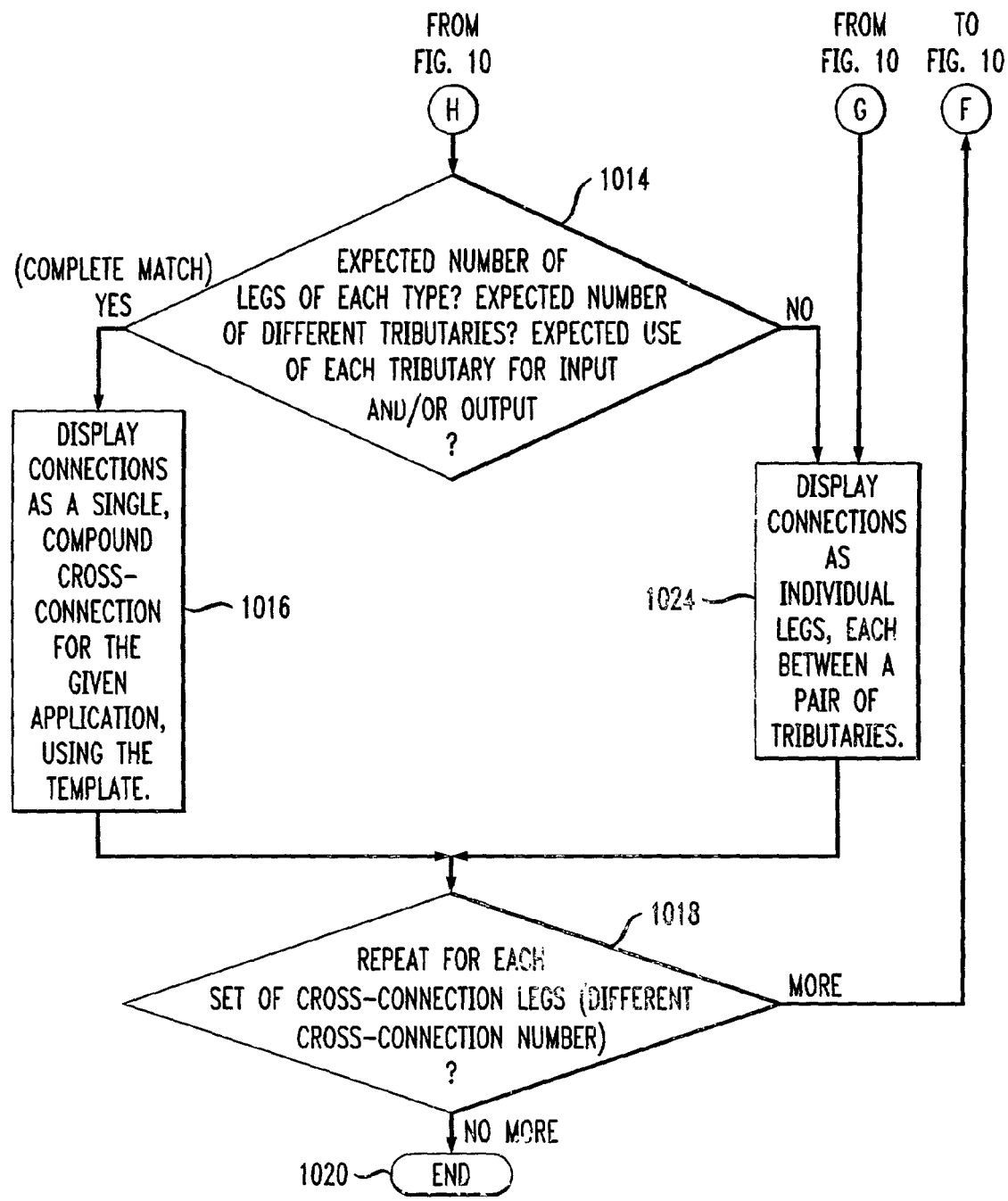

The flowchart of FIG. 10 illustrates the process whereby a user interacts with the integrated NE to retrieve cross-connection information from the integrated NE. (The conceptual block diagram of FIG. 12 illustrates tributary usage and cross-connection legs expected to be retrieved for the "UPSR (or SNCPRing) Add/Drop" application.) The process begins in step 1000 and proceeds from there to step 1002 where the user initiates the retrieval process. From step 1002 the process proceeds to step 1004 where the user interface controller retrieves the cross connection information (which may be stored within the NE or in a database outside the NE) and provides it separately for each cross connection leg between a pair of logical tributaries. There are six types of legs: 2-way point-to-point leg pair; 1-way point-to-point leg; 1-way path-protected, working leg; 1-way path-protected, protection leg; 1-way adjunct path-protected, working leg; and1-way adjunct path-protected, protection leg. From step 1004 the process proceeds to step 1006 where user interface controller associates any cross-connection legs having the same cross-connection number.

From step 1006 the process proceeds to step 1008 where user interface determines whether all legs having a particular cross-connection number have the same cross connection application code and cross-connection rate. If so, the process proceeds to step 1010 where the user interface determines whether the application is UPSR (or SNCP Ring) ADD/DROP application. If so, the process proceeds to step 1012 where the user attempts to match the legs with the template for connections in this application:
 1) 1-way path-protected, working leg: from path 1 to Add/Drop
 2) 1-way path-protected, protection leg: from path 2 to Add/Drop
 3) 1-way point-to-point leg: from Add/Drop to Path 1
 4) 1-way point-to-point leg: from Add/Drop to Path 2

From step 1012 the process proceeds to step 1014, where the controller determines whether there are the expected number of legs of each type, the expected number of different tributaries, and the expected use of each tributary for input and/or output. If so, the process proceeds to step 1016, where the controller displays connections as a single compound cross-connection for the given application, using a template. From step 1016 the process proceeds to step 1018 where the controller determines whether there are more sets of cross connection legs for which the process is to be repeated and, if not, the process proceeds to end in step 1020. If there are one or more sets of cross connection legs to be operated upon, the process returns to step 1008. If, in step 1010 the controller determines that another application is to be employed the process proceeds to step 1022 where the controller recognizes that the template for connections in another application may involved a different number of legs of each type, a different number of tributaries (or different tributary labels to be matched with the tributaries) or different usage of each tributary for input and/or output, and, consequently may invoke a similar process, with slightly different steps. From step 1022, the process proceeds to step 1014. If, in step 1014 the controller determines that there are not the expected number of legs of each type, the expected number of different tributaries, and the expected use of each tributary for input and/or output, the process proceeds to step 1024, where it displays the connections as individual legs, each between a pair of tributaries and, from there as previously described.

The integrated NE supports operations on provisionable sets of path protection groups using path protection group names. A Path Protection Group Name is a user-defined string that identifies a path protection group. When the same name is provisioned for a set of path protection groups—for example, those which draw their inputs from the same pair of ports—this name can be used to simplify operations on this set of path protection groups. A user can provision a Path Protection Group Name when establishing a cross-connection with the path-protected atomic topology, which automatically establishes a path protection group. The name can be changed by modifying a path protection group or when rolling a cross-connection.

Assigning names to path protection groups simplifies operations on any set of groups, especially those which draw their inputs from the same pair of ports. While legacy systems with only a single path switched ring were easy to operate, the use of the Path Protection Group Name enables similar ease of operations in a network element supporting multiple rings, logical rings, and ring interworking applications.

The name can be used to select a set of path protection groups for the Retrieve Protection Group, Modify Protection Group, and Operate Protection Switch commands. The command syntax allows the user to perform these commands on the set of all path protection groups with the given name. The command syntax additionally allows the user to narrow the selection to the path protection group (or groups) with the given name and a given input tributary. This meets the user's key need to perform these commands on the set of all paths received from the same pair of input ports. It additionally allows the user to perform them in a similar way on the path(s) received from a specific input tributary. The user can retrieve all cross-connections with a given Path Protection Group Name. The user can retrieve the complete list of Path Protection Group Names currently used by the network element. This includes information about the groups with each name.

Figure 11:
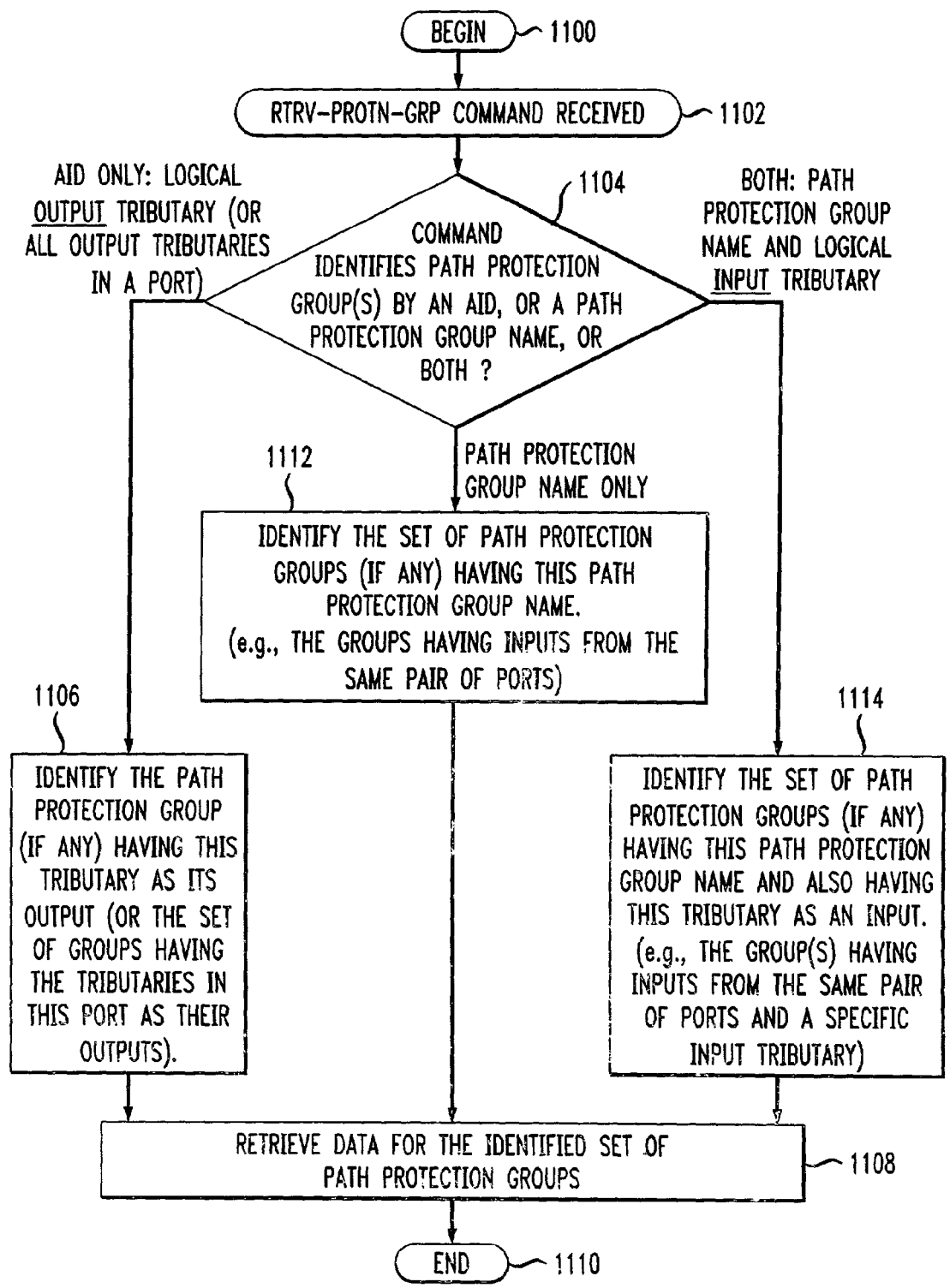
FIG. 11 is a flowchart that illustrates the process whereby a user may retrieve provisioning and path protection state information for path protection groups.

The integrated NE supports operations on provisionable sets of path protection groups by:
a) Provisioning a name for each path protection group for the purpose of associating and identifying it as a member of a set of path protection groups
b) Using the provisioned name to operate protection switches, to retrieve status, or to modify switching parameters for a set of path protection groups with a given name
c) Using the provisioned name to retrieve cross-connections associated with the path protection groups with a given name
d) Listing the currently used names and also the path protection groups and input ports with which each name is associated Turning now to the flowchart of FIG. 11, the use of a command (RTRV-PRTN-GRP) by a user to retrieve provisioning and current path protection state for one or more path protection groups and their constituent path selectors is demonstrated. The process begins in step 1100 and proceeds from thereto step 1102 where the controller receives the command. From step 1102 the process proceeds to step 1104 where the controller determines whether the command identifies the path protection group(s) by an AID, by a path protection group name, or both. In this illustrative embodiment, the AID of a path protection group is defined as the AID of its logical output tributary. If only an AID is employed, the process proceeds to step 1106 where the controller identifies the path protection group (if any) having this tributary as its output (—or the set of groups having the tributaries in this port as their outputs). From step 1106 the process proceeds to step 1108 where the controller retrieves data for the identified set of path protection groups and, from there, the process proceeds to end in step 1110.

If, in step 1104 the controller determines that the command identifies the path protection group by a path protection group name, the process proceeds to step 1112 where the controller identifies the set of path protection groups (if any) having this path protection group name (e.g., the groups having inputs from the same pair of ports). From step 1112 the process proceeds to step 1108 and from there as previously described. If in step 1104 the controller determines that the command identifies the path protection group(s) by both an AID and a path protection group name(s) (that is, by a path protection group name and an AID defined in this case to represent a logical input tributary rather than a logical output tributary) the process proceeds to step 1114 where the controller identifies the set of path protection groups (if any) having this path protection group name and this tributary as an input (e.g., the group(s) having inputs from the same pair of ports and a specific input tributary). From step 1114 the process proceeds to step 1108, and from there as previously described.

Figure 14:
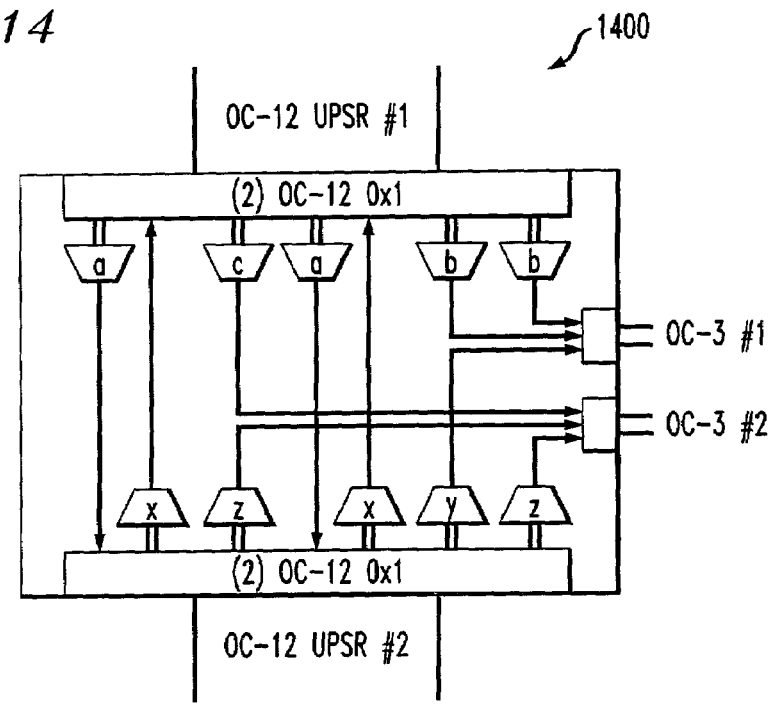
FIG. 14 is a conceptual block diagram that illustrates the assignment of path protection group names for a UPSR application.

The conceptual block diagram of FIG. 14 illustrates the assignment of path protection group names. The path protection group names may be assigned to each set of path protection groups which the user may want to operate together, and separately from other sets. Where only a single group with a particular connectivity between ports and a unique label (e.g., "c") is illustrated, this represents a set of path protection groups: one group for each of the STS-N/VC-N circuits using the tributaries of these ports.

Typically, the same name would be assigned for all groups dropping traffic from a given UPSR:
  Groups labeled a, b, c: UPSR#1
  Groups labeled x, y, z: UPSR#2

A user may want to separately operate a subset of groups from an UPSR, depending upon the destination:
  Groups labeled a: UPSR#1 to UPSR#2
  Groups labeled b: UPSR#1 to OC3#1
  Groups labeled c: UPSR#1 to OC3#2
  Groups labeled x: UPSR#2 to UPSR#1
  Groups labeled y: UPSR#2 to OC3#1
  Groups labeled z: UPSR#2 to OC3#2

Figure 15:
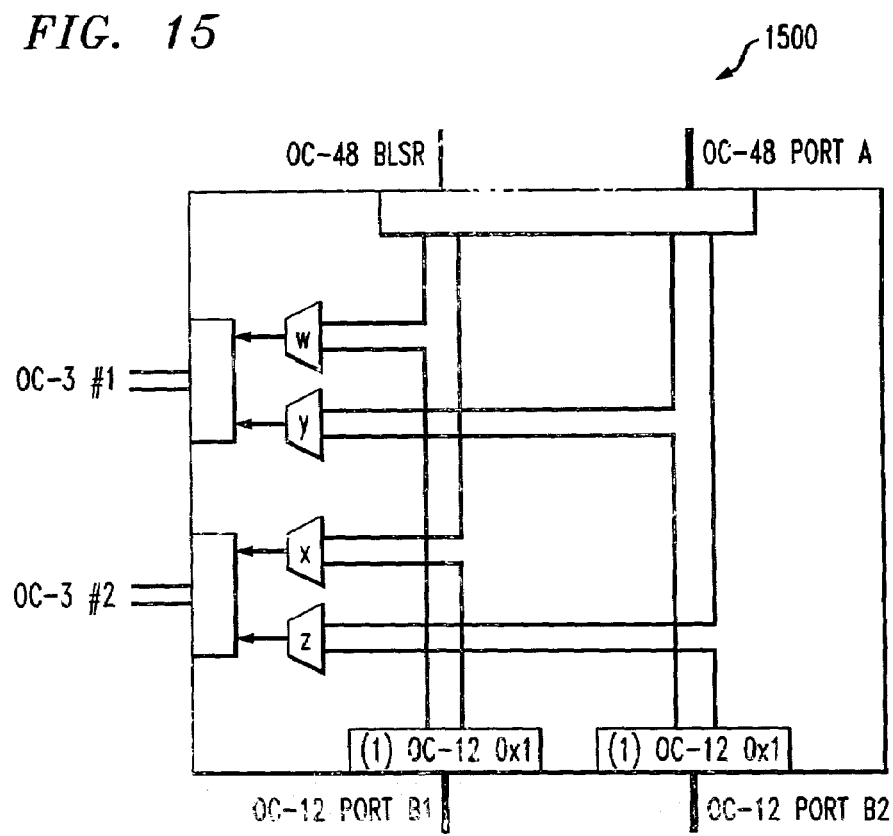
FIG. 15 is a conceptual block diagram that illustrates the assignment of path protection group names for a logical ring application.

The conceptual block diagram of FIG. 15 illustrate a logical ring application of the integrated NE wherein STS-N path protected traffic (in what would normally be two OC-12UPSRs B1 and B2) is transported through an OC-48 BLSR and some of this traffic is dropped by the same network element which provides a BLSR node. That is, traffic is dropped from logical rings consisting of tributaries on ports A and B1 or tributaries on ports A and B2.

Typically the same name would be assigned for all groups dropping traffic from a given pair of ports:
  Groups labeled w, x: LogicalRing#AB1
  Groups labeled y, z: LogicalRing#AB2

A user may want to separately operate a subset of groups from a pair of ports, depending on the destination:
  Groups labeled w: LogicalRing#AB1 to OC3#1
  Groups labeled x: LogicalRing#AB1 to OC3#2
  Groups labeled y: LogicalRing#AB2 to OC3#1
  Groups labeled z: LogicalRing#AB2 to OC3#2

Figure 16:
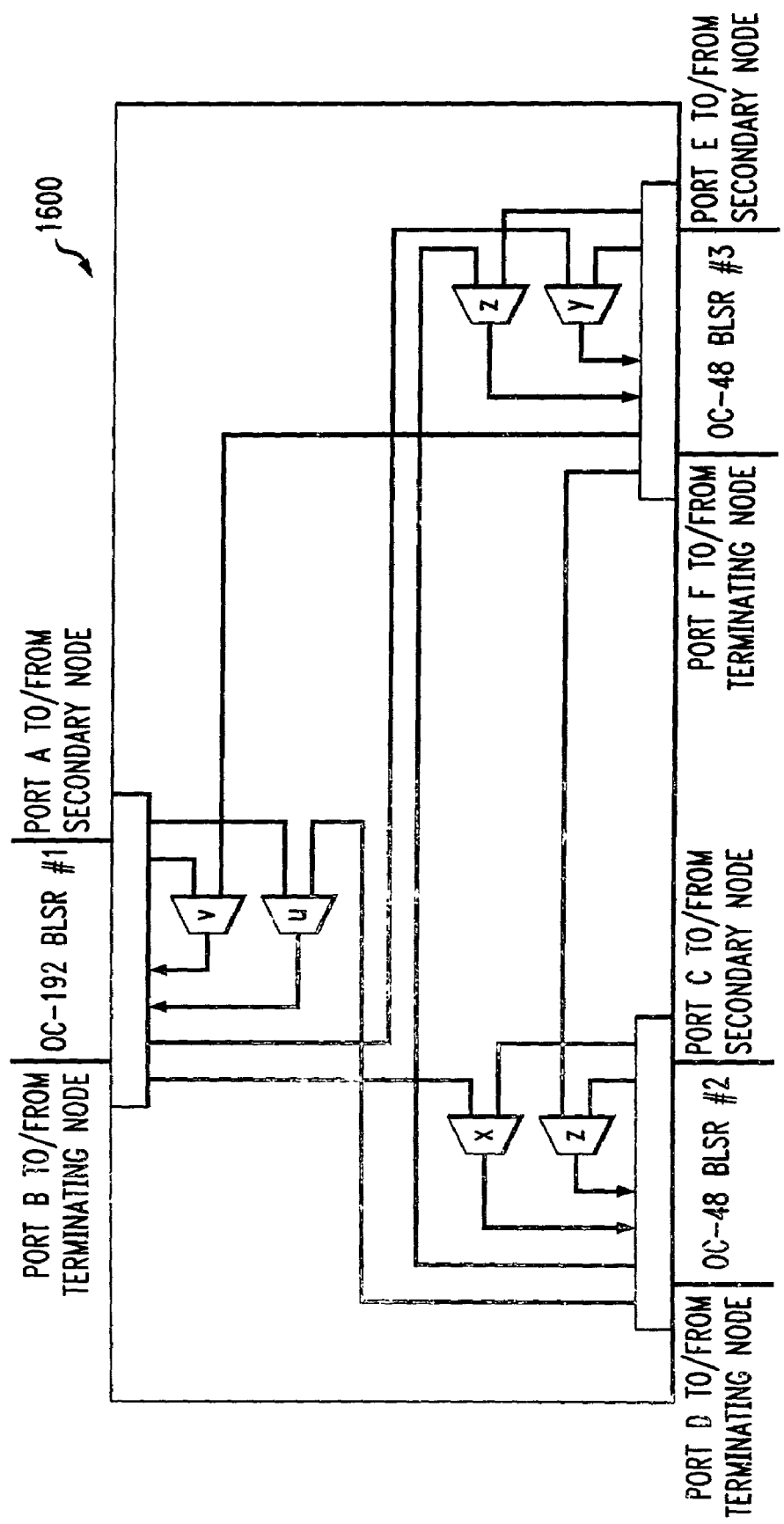
FIG. 16 is a conceptual block diagram that illustrates the assignment of path protection group names for a BLSR ring interworking application.

The conceptual block diagram of FIG. 16 illustrates Ring interworking with the Drop and Continue method, for BLSR Primary Nodes in the same NE. In this example some of the traffic is transported through each given pair of BLSRs and protected by ring interworking between that pair of BLSRs. The same NE serves as the primary node in both BLSRs for each of the circuits. Typically, the same name would be assigned for all groups selecting traffic from a given pair of ports. For ring interworking with drop and continue in a BLSR (and primary nodes in the same NE), these groups are selecting either the "continue" traffic, drawn from the port receiving the secondary node in the same ring, or the "inter-ring" traffic, drawn from the port receiving from the terminating node in one of the other rings. The names used in this example identify these ports, in this order. Also, in this illustrative example, the secondary nodes for these particular circuits in BLSRs 1, 2, and 3 are in the direction of ports A, C, and E, respectively, and the terminating nodes are in the direction of ports B, D, and F respectively.
  Groups labeled u: BLSR#1A-BLSR #2D
  Groups labeled v: BLSR #1A-BLSR #3F
  Groups labeled w: BLSR #2C-BLSR #1B
  Groups labeled x: BLSR #2C-BLSR #3F
  Groups labeled y: BLSR #3E-BLSR #1B
  Groups labeled z: BLSR #3E-BLSR #2D Glossary:
  Port (Line): A physical transmission interface, consisting of both an input and an output, which may be used to carry traffic between network elements. The words "port" and "line" may often be used synonymously. "Port" emphasizes the physical interface, and "line" emphasizes the interconnection. Either may be used to identify the signal being carried. Optical ports can be provisioned for either SONET OC-N or SDH STM-N operation (when SDH is supported for that type of port). Operational differences determined by a port's provisioning include: pointer processing, fault and performance monitoring (parameters and reporting), maintenance signaling (unequipped, AIS, RDI, cross-connections (supported rates), and protection switching. The operations on a port (line) include SONET line-level (or SDH multiplex section level), and DS3 fault and performance monitoring. Some operations apply to only the input or output of a port; others may apply to both the input and output.

Port Protection Group: A user-provisioned association of optical interface ports which is used for line protection (or SDH multiplex section protection) in a particular type of network configuration. The group of ports represents both a protection switching entity and also a set of lines that carry services from/to another network element(s). Port protection groups also determine, for optical interface ports, the set of "logical tributaries" from and to which the user can provision cross-connections. The operations on a port protection group include the provisioning, control, and status of line protection switching.

Ring-Side and/or Line in a Port Protection Group: When an optical interface port is provisioned as a member of a port protection group for a specific type of line protection, the port (line) is assigned a ring-side (west or east) and/or line name (working or protection) to identify its role. The operations on "logical tributaries" in a port protection group (cross-connections and path-level fault and performance monitoring) identify the tributaries as being part of a specific ring-side and/or line. Also, some of the line protection switching operations apply to a specific ring-side or line in the port protection group.

Port Tributary: A path-level unit of bandwidth within a port, or the signal(s) being carried in this unit of bandwidth; for example, an STS-1, STS-3, or STS-12 tributary within an OC-N port, or an STS-1 tributary associated with a DS3/EC-1 port, or a VC-3 or VC-4 tributary associated with an STM-N port. The operations on a port tributary include retrieval of path-level maintenance signals. The operations which apply to a logical tributary can apply to a port tributary, but only when (and because) it is the same entity.

Logical Tributary: A path-level unit of bandwidth within a port protection group (or a port not in a port protection group), or the signal(s) being carried in this unit of bandwidth; for example, an STS-1, STS-3, or STS-12 tributary within an OC-N line in a port protection group, or an STS-1 tributary associated within a DS3/EC-1 port, or a VC-3 or VC-4 tributary within an STM-N line in a port protection group. A logical tributary in a port which is NOT in a port protection group (electrical port or unprotected optical port) is the same entity as a port tributary. A logical tributary in a port protection group is a different entity, on the protected (switched) side of the group, opposite a port tributary. The identifier for a logical tributary refers to the port tributary used for transmission NORMALLY, in the absence of a line protection switching event. The actual connectivity during line protection switching depends on the provisioning and current state of the port protection group. A logical tributary is associated with a particular service (unit of traffic) carried from/to another network element(s). The operations on a logical tributary include cross-connections and path-level fault and performance monitoring. Some operations apply to logical input and/or output tributaries, and others to logical input tributaries only. The operations which apply to a port tributary can apply to a logical tributary, but only when (and because) it is the same entity.

Working Tributary: A port tributary carrying traffic which can be protected in a port protection group. Also, a logical tributary associated with such a port tributary. "Service tributary" is used in this document as a synonym for "working tributary".

Protection Tributary: An port tributary which can be used to protect the traffic carried by a working tributary in a port protection group. Also, a logical tributary associated with such a port tributary if protection access is supported in that port protection group.

Protection Access: The ability to provision traffic to be carried by protection tributaries when the port tributaries are not being used to carry the protected working traffic.

Cross-Connection: A reconfigurable transmission path interconnection within a network element between or among logical input and output tributaries. The logical input and output tributaries in each type of port or port protection group are the only entities from and to which the user can provision cross-connections. For a port which is NOT in a port protection group (electrical port or unprotected optical port), a logical tributary is the same entity as a port tributary. For a port which IS in a port protection group, the identifier for a logical tributary refers to the port tributary used for transmission NORMALLY, in the absence of a line protection switching event. The transmission connectivity required for line protection switching is determined automatically by the provisioning and current state of the port protection group.

Cross-Connection Rate: The attribute of a cross-connection that defines the path-level bandwidth that the cross-connection can carry. SONET rates include: STS-1, STS-3, STS-12, and STS-48. The corresponding SDH rates are: VC-3, VC-4, VC-4-4c and VC-4-16c. The manner in which this bandwidth is used, in terms of constituent signals, is determined by the provisioning of the associated input tributaries for either adaptive-rate (pipe mode) or fixed-rate operation. With adaptive-rate tributary operation, an STS-N cross-connection could have a single STS-Nc constituent signal or any mix of multiple lower-rate constituent signals e.g., STS-1s and STS-3cs in an STS-12), consistent with the SONET standard. Transitions between these constituent signal rates can take place. The system adapts to the current concatenation state by auto-detection of the concatenation indicators in the signal. With fixed-rate tributary operation, the allowed constituent signal rate of the cross-connection is deter-mined by the user-provisionable tributary rate. In order to flexibly allow interworking between SONET and SDH ports in global application, the system treats VC-3 and STS-1 cross-connection rates as identical and VC-4 and STS-3 cross-connection rates as identical. With SONET ports provisioned for fixed-rate operations allowed constituents for an STS-1, STS-3, STS-12, or STS-48 cross-connection from a fixed rate port are STS-1, STS-3c, STS-12c or STS-48c, respectively:

STS-1 Equivalent: Unit of cross-connection capacity in terms of STS-1 bandwidth units, independent of the actual mix of cross-connection rates (e.g., STS-1, STS-3, STS-12). Abbreviation: STS-1 eqv.

Cross-Connection Topology: The attribute of a cross-connection that defines the relationship between/among input(s) and output(s). The topology of a cross-connection defines the number of legs in the cross-connection, whether the inputs and/or outputs of some legs are the same logical tributary, and whether any path protection groups are included.

Cross-Connection Leg: A one-way connection provisioned from one logical input tributary to one logical output tributary. Each leg is identified as an entity by its logical input and output tributaries, its cross-connection rate, and the type of cross-connection topology it is part of. The operation of retrieving cross-connections can be done in terms of cross-connection legs between specific logical tributaries.

Synchronous Payload Envelope (SPE): The combined payload and path overhead of an STS-1, STS-3c, STS-12c, or STS-48c as defined in ANSI T1.105, R7, Section 7.

High Order (HO) Virtual Container (VC-N): The information payload and path overhead of an AU-N, as defined in ITU G.707, 3/96, Section 3. The SDH equivalent of the STS SPE. The following are equivalent in rate and format: (HO) VC-3 and STS-1 SPE, VC-4 and STS-3c SPE, VC-4-4c and STS-12c, VC-4- 16c and STS-48c. Note that there is also a Low Order VC-3 mapping that maps VC-3 into TUG-3 into VC-4. All references to VC-3 are to the High Order VC-3, unless otherwise stated.

Signal Rate: Terminology used for the STS SPE or VC content of the signal: "STS-1" signal rate (STS-1 SPE), "STS-Nc" signal rate" (STS-Nc SPE), or "VC-N" signal rate, or "VC-4-Nc" signal rate.

Administrative Unit (AU-N): The VC-N signal plus its associated pointer/pointer action bytes.

Administrative Group (AUG): A tributary position within an STM-N interface consisting of a single AU-4 or three AU-3s having the same boundary requirements as that of an STS-3 in an OC-N interface.

Fixed-Rate Tributary Operation of a Port: The user provisions tributaries for the expected signal rates. The system uses this provisioning information for cross-connection rate validation and for fault handling (e.g., Loss of Pointer) when signals are not received at these rates.

Adaptive-Rate (Pipe) Tributary Operation of a Port: The user does not provision tributaries for expected signal rates. The system identifies, and adapts to transitions in, the signal rates.

Tributary Rate: The signal rate provisioned by the user for an input or output tributary in a port provisioned for fixed-rate tributary operation.

Constituent Signal: An STS-N(c) or VC-N (or VC-4-Nc) signal (rate) that is carried by a cross-connection leg. Operations on a constituent signal are addressed to a logical tributary and do not extend beyond those defined for logical tributaries.

Constituent Path Selector: A path-level protection switching function that selects the better of two constituent signals in the two logical input tributaries and operates at the constituent signal rate. With adaptive-rate tributary operation, a path protection group in a cross-connection with an STS-3 or STS-12 cross-connection rate provides path-level protection switching for all the constituent signals carried by the cross-connection. There may be one or more constituent path selectors operating independently within each path protection group, one for each constituent signal in the logical output tributary. The path protection group adapts to the current constituent signal rates. The operations on a constituent path selector include the control and status of path protection switching. Operations on a constituent path selector are addressed to a logical output tributary. Since the path pro-tection group is addressed in the same way, any operations that can apply to both a path protection group and a constituent path selector must be differentiated by the commands themselves.

Working Path: One of two signals entering a constituent path selector, the working path is the path carried by the working cross-connection leg of the path protection group.

Protection Path: One of two signals entering a constituent path selector, the protection path is the path carried by the protection cross-connection leg of the path protection group.

Active Path: One of two signals entering a constituent path selector, the active path is the path currently being selected.

Standby Path: One of two signals entering a constituent path selector, the standby path is the path not currently being selected. The working path, protection path, active path, and standby path are each addressed by a logical input tributary.

Path Protection Group: The part of a cross-connection topology that is provisioned to provide path-level protection switching for all the constituent signals carried by the cross-connection. The operations on a path protection group include the provisioning of path protection switching.

Atomic Cross-Connection Topology: A one-way cross-connection topology which can be set up and taken down by one command to the network element, but which cannot have a smaller part of it set up or taken down.

Compound Cross Connection Topology: A particular set of one or more atomic cross-connections between input and output tributaries in a Network Element for a circuit in a specific network application.

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter connected to the network over a medium. The medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention.

The forgoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. Applicant thus regard any means which can provide those functionalities as equivalent as those shown herein. Many other modifications and applications of the principles of the invention will be apparent to those skilled in the art and are contemplated by the teaching herein. Accordingly, it is intended that the scope of the invention is limited only by the claims appended hereto

What is claimed is:

1. An integrated telecommunications network element comprising:
    a plurality of add-drop-multiplexers, each add-drop-multiplexers having one or more communications ports, each communications port carrying communications traffic including one or more port tributaries;
    a digital cross-connect configured to route communications traffic among the port tributaries; and
    a controller configured to create one or more logical tributaries between the digital cross-connect and the communications ports by mapping one or more port tributaries into a logical tributary.

2. The network element of claim 1 wherein:
the controller is configured to route working traffic from a port through a logical tributary to the digital cross-connect.

3. The network element of claim 2 wherein:
the controller is responsive to one or more provisioning commands from a user by provisioning cross-connections between logical tributaries.

4. The network element of claim 2 wherein:
the controller is responsive to a provisioning command from a user to provision working and protection paths from one port to another by determining the switching status of port tributaries.

5. The network element of claim 2 wherein:
the controller is responsive to one or more commands received from a user by establishing a port protection group.

6. The network element of claim 5 wherein:
the controller is responsive to one or more provisioning commands from a user by determining whether a port associated with a particular port tributary is a member of a port protection group.

7. The network element of claim 6 wherein:
the controller is responsive to one or more provisioning commands from a user by determining what type of port protection group the port is a member of.

8. The network element of claim 6 wherein:
the controller is responsive to one or more provisioning commands from a user by determining the state of protection switching.

9. The network element of claim 2 wherein:
the controller is responsive to one or more commands received from a user by establishing a path protection group.

10. The network element of claim 9 wherein:
the controller is responsive to one or more provisioning commands from a user by determining whether a path associated with a particular port tributary is a member of a path protection group.

11. The network element of claim 10 wherein:
the controller is responsive to one or more provisioning commands from a user by determining what type of path protection group the port is a member of.

12. The network element of claim 10 wherein:
the controller is responsive to one or more provisioning commands from a user by determining the state of protection switching.

13. The network element of claim 2 wherein:
the controller is responsive to commands from a user directed toward a logical tributary by identifying a port tributary corresponding to the logical tributary.

14. The network element of claim 2 wherein:
the controller is responsive to commands from a user directed toward a logical tributary by determining which of a plurality of port tributaries is to be employed as a working tributary.

15. The network element of claim 2 wherein:
the controller is responsive to commands from a user directed toward a logical tributary by determining which of a plurality of port tributaries is to be employed as a protection tributary.

16. The network element of claim 2 wherein:
the controller is responsive to a port access identifier by retrieving network equipment information from the access identifier.

17. The network element of claim 2 wherein:
the controller is responsive to a tributary access identifier by retrieving network equipment information from the access identifier.
18. The network element of claim 2 wherein:
the controller is responsive to one or more user commands by establishing an atomic cross connection.
19. The network element of claim 2 wherein:
the controller is responsive to one or more user commands by modifying a provisionable set of path protection groups.
20. The network element of claim 2 wherein:
the controller is responsive to one or more user commands by provisioning a cross-connection between logical tributaries.
21. In a multi-port telecommunications network element, a method for switching traffic comprising the steps of:
A) receiving communications traffic at one communications port of a plurality of add-drop-multiplexers, each add-drop-multiplexers having one or more communications ports, each communications port carrying communications traffic including one or more port tributaries;
B) routing the communications traffic from a port tributary through a digital cross-connect configured to route communications traffic among the port tributaries;
C) a controller creating one or more logical tributaries between the digital cross-connect and the communications ports by mapping one or more port tributaries into at least one logical tributary; and
D) the controller provisioning traffic among port tributaries in response to commands to provision traffic among logical tributaries.
22. The method of claim 21 wherein:
E) the controller routes working traffic from a port through a logical tributary to the digital cross-connect.
23. The method of claim 22 wherein:
F) the controller determines the switching status of port tributaries in response to a provisioning command from a user to provision working and protection paths from one port to another.
24. The method of claim 22 wherein:
G) the controller establishes a port protection group in response to one or more commands received from a user.
25. The method of claim 24 wherein:
H) the controller determines whether a port associated with a particular port tributary is a member of a port protection group in response to one or more provisioning commands from a user.
26. The method of claim 25 wherein:
I) the controller determines what type of port protection group a port is a member of in response to one or more provisioning commands from a user.
27. The method of claim 25 wherein:
J) the controller determines the state of protection switching in response to one or more provisioning commands from a user.
28. The method of claim 22 wherein:
K) the controller establishes a path protection group in response to one or more commands received from a user.
29. The method of claim 28 wherein:
L) the controller determines whether a path associated with a particular port tributary is a member of a path protection group in response to one or more provisioning commands from a user.
30. The method of claim 29 wherein:
M) the controller determines what type of path protection group the port is a member of in response to one or more provisioning commands from a user.
31. The method of claim 29 wherein:
N) the controller determines the state of protection switching in response to one or more provisioning commands from a user.
32. The method of claim 22 wherein:
O) the controller identifies a port tributary corresponding to the logical tributary in response to commands from a user directed toward a logical tributary.
33. The method of claim 22 wherein:
P) the controller determines which of a plurality of port tributaries is to be employed as a working tributary in response to commands from a user directed toward a logical tributary.
34. The method of claim 22 wherein:
Q) the controller determines which of a plurality of port tributaries is to be employed as a protection tributary in response to commands from a user directed toward a logical tributary.
35. The method of claim 22 wherein:
R) the controller retrieves network equipment information from a port access identifier.
36. The method of claim 22 wherein:
S) the controller retrieves network equipment information from a tributary access identifier.
37. The method of claim 22 wherein:
T) the controller by establishing an atomic cross connection in response to one or more user commands.
38. The method of claim 22 wherein:
U) the controller modifies a provisionable set of path protection groups in response to one or more user commands.
39. The method of claim 22 wherein:
W) the controller provisions a cross-connection between logical tributaries in response to one or more user commands.

\* \* \* \* \*